(12) United States Patent
Ralph et al.

(10) Patent No.: US 6,722,875 B2
(45) Date of Patent: Apr. 20, 2004

(54) VERTICAL INJECTION MOLDING MACHINE

(75) Inventors: Brian J. Ralph, Medina, OH (US); Paul Zakich, Cuyahoga Falls, OH (US)

(73) Assignee: Van Dorn Demag Corporation, Strongsville, OH (US)

( * ) Notice: Subject to any disclaimer, the term of this patent is extended or adjusted under 35 U.S.C. 154(b) by 174 days.

(21) Appl. No.: 10/124,515

(22) Filed: Apr. 17, 2002

(65) Prior Publication Data

US 2003/0198709 A1 Oct. 23, 2003

(51) Int. Cl.[7] ............................................... B29C 45/64
(52) U.S. Cl. .................... 425/576; 425/589; 425/595
(58) Field of Search ................................ 425/576, 589, 425/595

(56) References Cited

U.S. PATENT DOCUMENTS

| | | |
|---|---|---|
| 4,504,208 A * | 3/1985 | Kurumaji et al. ............ 425/589 |
| 4,944,669 A | 7/1990 | Zakich |
| 5,035,606 A | 7/1991 | Zakich |
| 5,091,124 A | 2/1992 | Zakich |
| 5,338,171 A | 8/1994 | Hayakawa et al. |
| 5,776,516 A | 7/1998 | Armbruster et al. |
| 6,010,324 A | 1/2000 | Oshiro et al. |

\* cited by examiner

*Primary Examiner*—Tim Heitbrink
(74) *Attorney, Agent, or Firm*—Fay, Sharpe, Fagan, Minnich & McKee, LLP

(57) ABSTRACT

An injection molding machine with a vertically operating clamp mechanism is provided with a pair of locking devices on the upper movable platen to lock the locking rods for high tonnage clamping forces. Each locking device uses spring biased actuating rods to simultaneously lock two locking rods to the movable platen in an always "on" arrangement. A power on actuator is provided to release the locking device for raising and lowering the movable platen. A vertical ladder frame is provided for guiding the movable platen when it is raised or lowered. Additionally, a lift mechanism is provided for a rotary table carrying the lower mold halves.

29 Claims, 12 Drawing Sheets

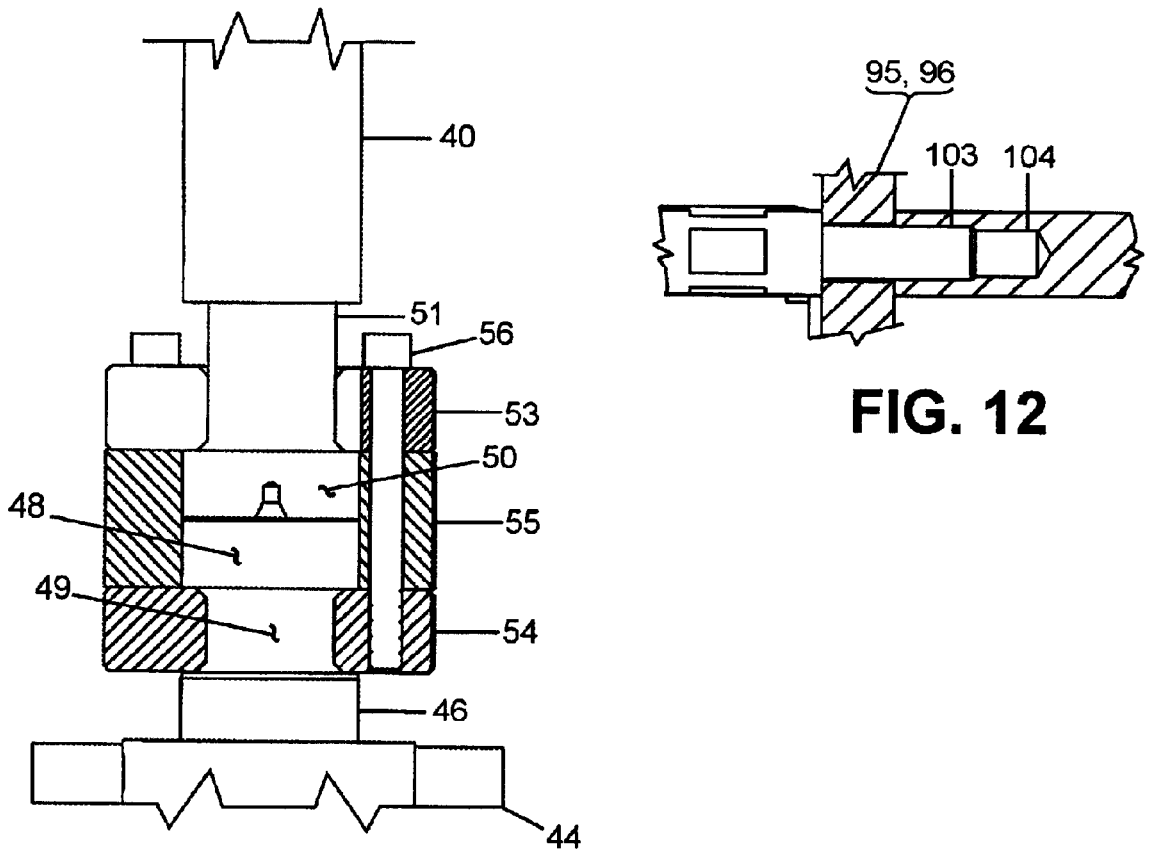
FIG. 12
FIG. 13
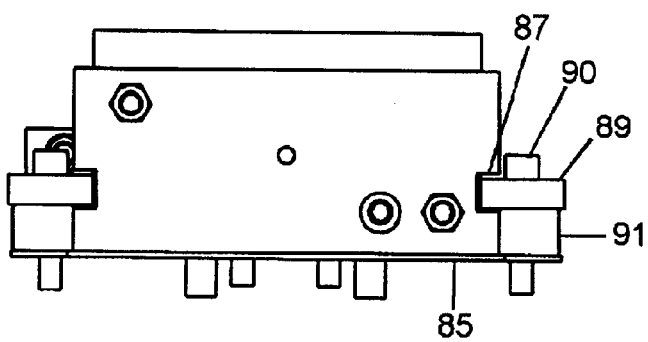
FIG. 14

VERTICAL INJECTION MOLDING MACHINE

This invention relates generally to injection molding machines and more particularly to injection molding machines having vertically oriented clamp systems.

BACKGROUND

"Vertical" injection molding machines consist of an injection unit mounted either with a horizontal or vertical orientation and a clamp system oriented vertically to hold the two mold halves together under force sufficient to resist the pressure exerted by the molten plastic. Orientation of the clamp system vertically allows for operational ease as compared with horizontal clamp systems for certain applications including, but not limited to, insert molding and cable connectors.

The clamp systems commercially used in today's vertical injection molding machine generally comprise either a three platen (or plate) or "C"-frame systems.

Tie bar type machines typically use three main plates conventionally known as a stationary platen, an end platen, and a movable platen. In these designs, the stationary platen mounts the stationary mold half and the movable platen mounts the movable mold half. The end platen is used to mount the traverse actuators and the tonnage actuators. In a straight hydraulic clamp, the end platen houses the tonnage cylinder. In a toggle clamp, the end platen mounts the tonnage cylinder and the toggle linkage mechanism employed as a force multiplier. In either system, the end platen is used to react the forces when tonnage is developed to hold the two mold halves together. This is a general description of tie-bar or tie rod type machines present in the commercial marketplace. Within the patent literature, a number of variations are present.

In C-frame machines there are no tie bars and a large frame acts as both the stationary platen and the end platen. The stationary half of the mold mounts to the lower C-frame and the movable mold half mounts to the movable platen. The movable platen is again driven by actuators mounted on the upper C-frame and may be either straight hydraulic or incorporate a toggle linkage to develop tonnage. In either system, the C-frame upper and lower halves act to react against the force generated during tonnage application. This is a general description of C-frames in the commercial marketplace today. Within the patent literature, variations probably exist.

The overall height of the conventional vertical machines is therefore higher than what is otherwise required because of the presence of the end plate or the top leg of the "C"-frame. It is to be appreciated that, because the stationary platen of a vertical injection machine is mounted to ground, vertical molding machines are inherently suited to large, heavy mold applications requiring high mold tonnage. Conventional, large vertical machines thus require massive mold frames which raise height clearance concerns. In contrast, horizontal machines have length concerns but such concerns can be addressed, in most instances, by plant layout techniques.

More recently, the injection molding machine industry has begun commercializing two-platen mold clamping systems which have reduced the length of horizontal machines. Reference can be had to assignee's U.S. Pat. No. 5,776,516 to Armbruster et al., issued Jul. 7, 1998, for an example of a two-platen mold assembly.

In the patent literature, reference can be had to U.S. Pat. No. 5,338,171 to Hayakawa et al., issued Aug. 16, 1994, for a description of a number of mold clamp systems, including a two-platen system for a vertical machine. The two-platen mold systems under discussion are characterized by high tonnage, hydraulic piston-cylinder units with small piston travel displacing little hydraulic fluid because a smaller driving cylinder, pneumatic or hydraulic, is used to move the mold halves into and out of molding engagement. The movable platen moves into and out of molding engagement and is maintained in molding engagement under high tonnage by tie rods or by bushings for guide bars and the like. For the horizontal machine, this mounting/guiding arrangement is acceptable because the weight of the platen can be supported by rollers (indirectly in contact with ground) which can also assure alignment. For the vertical machine, the guide bars must closely control and guide the movable platen to assure consistently repeatable cycles necessary for the mold guide pins to properly align the mold halves. Bushings wear and require constant maintenance to assure lubrication of clean surfaces.

Additionally, the high tonnage lock rods must be positively locked for clamp tonnage and unlocked. Also, there are safety requirements that require the mold position to be locked in event of power failure, emergency stop, intrusion into the clamp zone, etc. The requirements are especially pertinent for vertical injection molding machines because they require that the movable platen be prevented from dropping vertically. Typically, the safety requirements for a positional lock are met by a locking rod which is usually located out of the center of acting forces. In the case of an emergency lock, a conventional locking rod could create significant damage to the system because of disproportional distribution of inertia forces. In one of the inventors' earlier patents, U.S. Pat. No. 5,035,606, issued Jul. 30, 1991, a fail safe locking arrangement is disclosed which overcomes many of the problems present in conventional locking arrangements. This invention improves on the locking arrangement disclosed in the '606 patent which is incorporated herein by reference.

A particular advantage that vertical injection molding machines possess is the ability for the machines to be equipped with a rotating table overlying the stationary platen. The table is equipped with a plurality of stationary mold halves that are rotated by the table through successive work stations to reduce the overall process time. For example, after molding, the stationary mold half with the molded part is rotated to an ejector station where ejector pins dislodge the molded part from the mold cavity. The transfer to an ejection station while another mold half is simultaneously rotated into a molding relationship with the movable platen, reduces the cycle time otherwise required in a horizontal machine to eject the part, or alternatively, employ complicated mold transfer mechanisms to shuttle mold halves into and out of the clamp. Other stations on the rotating table may be dedicated to robotic part removal, insert placing, etc.

Typically, the table is rotated in sliding contact with the stationary platen and the station position is determined by limit or proximity switches. The sliding table motion requires lubrication and maintenance and also limits the mold weight of a machine otherwise inherently suited for executing large clamping forces.

SUMMARY OF THE INVENTION

Accordingly, it is a general object of the present invention to provide an improved vertical type injection molding machine which addresses the concerns discussed in the Background.

This general object along with other features of the invention is achieved in a vertical injection molding machine which includes a lower stationary platen upon which a lower mold half is mounted and an upper vertically movable platen on the bottom side of which is mounted an upper mold half in confronting relation to the lower mold half. An advance mechanism is provided for raising and lowering the movable platen relative to the stationary platen and the machine has an injection unit for injecting molding material into one of the mold halves when the mold halves have been moved into a molding relationship. A plurality of vertically extending locking rods positioned to straddle the mold halves is provided with each locking rod being attached at one end thereof to the stationary platen (for example, by being connected to a high tonnage clamp piston of a cylinder mounted to the stationary platen). Each locking rod extends through a locking rod opening in the movable platen and has a plurality of longitudinally spaced annular grooves extending over a rod length adjacent the opposite locking rod end (i.e., the top end) to a position which is at least adjacent to the movable platen. A locking device is provided on the top side of the upper movable platen for locking the upper movable platen at any set distance from the stationary lower platen.

The locking device includes a caliper for each locking rod having inboard and outboard caliper halves with each caliper half having a generally semi-circular, radially inward protruding lock ring adapted to fit within a locking groove when the inboard and outboard caliper halves are moved together to form a generally circular locking ring. The locking device further includes first and second actuating rods. The first rod is secured to the inboard caliper half of a first caliper at one end of the rod and to the outboard caliper half of the second caliper at the opposite end of the first rod. Similarly, the second actuating rod is secured to the outboard caliper half of the second caliper at one end of the second rod and to the inboard caliper half of the first caliper at its opposite end. The locking device also includes a piston rod connector plate and a cylinder connector plate. The piston rod plate is secured to the first actuating rod at a first distance between the ends of the rod and through which the first actuating rod extends and, in addition, has a first opening for slidably receiving the second actuating rod. Similarly, the cylinder connector plate is fixed to the second actuating rod at a second distance between the ends of the second actuating rod and through which the rod extends and also has an opening for slidably receiving the first actuating rod. A compression spring is situated between the piston rod connector plate and the cylinder connector plate to simultaneously bias both inboard and outboard caliper halves of both first and second calipers to a closed position while an opening mechanism also attached to the piston rod connector plate and the cylinder connector plate is provided for drawing the connector plates towards one another to simultaneously open both inboard and outboard caliper halves of both first and second calipers. Thus, the locking mechanism provides an always on, spring biased locking device simultaneously locking two calipers and their associated locking rods to meet safety concerns while a power-on arrangement is utilized to disable the locking device for raising and lowering the upper movable platen at the completion and commencement of successive molding cycles.

In accordance with another aspect of the invention related to the locking device, the movable platen is generally rectangular in configuration having longitudinally extending sides and short sides with a locking device adjacent a long side on the top surface of the movable platen so that the machine has two locking devices and the first and second calipers of each locking device assembly are positioned at opposite corners of a long side so that each machine has four locking rods. The opening mechanism includes a piston movable within a cylinder housing mounted to the cylinder connector plate and the piston has a piston rod extending therefrom mounted to the piston rod connector plate. Additionally, the cylinder housing has a cylinder stop rod protruding in an opposite direction from the piston rod. A piston rod mounting block is provided which is secured to the movable platen and through which the piston rod slidably extends and also a cylinder rod mounting block is provided which is, likewise, secured to the movable platen and through which the cylinder rod slidably extends. The actuating rods are connected only to the caliper halves and to the connector plates and the connector plates, in turn, are only connected to the piston/cylinder opening mechanism which, in turn, is connected to the movable platen only by the sliding fit established by the mounting blocks so that the locking device is free to float allowing the actuating rods to center themselves in the calipers to assure positive opening and closing of the locking device.

In accordance with a more specific feature of the invention, the floating arrangement of the actuator rods is continued into the design of the calipers which includes a caliper block secured to the movable platen adjacent a long side of each caliper and functioning as the only attachment of the caliper to the movable platen. The caliper (or alternatively, the caliper mount) has a longitudinally extending groove and the caliper mount (alternatively, the caliper) has a protrusion slidable in the groove duplicating the sliding attachment provided for the piston/cylinder opening mechanism of the locking device. A lubricated wear plate between caliper halves and the moving platen assures movement of the caliper halves. The caliper mounting arrangement further assures full utilization of the compressive force of the locking device spring without sticking or binding of the device thus avoiding more complicated caliper tie-down arrangements such as the utilization of a top plate and/or the requirement of having multiple lock rings in each caliper.

In accordance with another aspect of the invention that further assures positive actuation of the locking devices, each caliper has a long side generally parallel to the long side of the movable platen. Any given caliper has an actuating rod secured to an outboard caliper half and an actuating rod secured to an inboard caliper half adjacent one long caliper side while an actuating rod secured to an inboard caliper half and an actuating rod secured to an outboard caliper half is adjacent to the opposite long caliper side so that even clamping forces are distributed by four actuating rods to each caliper. Thus, each machine has two locking devices. Each locking device locks and unlocks two locking rods and each locking device has four actuating rods.

In accordance with another aspect of the invention, the opposite or top locking rod ends of each locking rod are secured to a locking rod bridge. A proximity (or alternatively a limit) switch on a caliper senses the position of the teeth and grooves on one of the locking rods. The advance mechanism lowers the movable platen to a molding position whereat the short stroke, high tonnage piston/cylinders can exert a clamping force on the mold halves. The locking rod bridge assures that all four corner positioned locking rod teeth and grooves are in reasonable alignment at the molding position so that the locking ring of each caliper can fully engage a groove/shoulder in the locking rod when the advance mechanism brings the mold halves into molding relation prior to actuation of the high tonnage actuators. In the preferred embodiment, the locking rod bridge is a simple structural steel fabrication, preferably of angle iron which has good resistance to twisting while lacking any significant load bearing capacity (since that function is performed by the calipers and locking rods in the upper platen). Locking rod alignment of all four locking rods as a unit is therefore maintained by a special mounting arrangement firmly securing the bottom end of each locking rod to the piston of a high tonnage piston/cylinder that allows a floating connection when the movable platen is raised or lowered while the opposite top end of all locking rods are tied together by the locking rod bridge.

In accordance with another somewhat separate but related aspect of the invention, a vertically extending ladder frame is mounted to the stationary platen. The vertical ladder frame has a pair of laterally spaced and parallel vertical guide rails which are secured to the frame and each guide rail has a pair of runner blocks slidable on the rails in a secure manner. A pair of parallel mounting block plates are secured to one of the long sides of the movable platen and extends above the top surface and below the bottom surface of the movable platen. Each mounting block plate confronts a guide rail and the runner blocks are secured to the block mounting plates above and below the top and bottom movable platen surfaces so that the movable platen is maintained and aligned at a set relationship to the stationary platen throughout its travel. This arrangement obviates the need for close toleranced bushings and sleeves to be fitted within the movable platen which would otherwise be required to maintain alignment (within thousandths of an inch to assure seating of guide pins, sleeves, etc.) of the confronting mold halves.

In accordance with another specific aspect of the invention, the vertical frame also mounts one end of each of the carriage positioning/reaction cylinders of the injection unit to a reaction block slidable on a vertical support, in turn, fixed at each end thereof to a cross-over member on the vertical frame. The nozzle of the injection unit extends between the vertical supports and the carriage positioning/reaction cylinders mounted to the injection unit are free to vertically move and maintain alignment as the injection unit is raised or lowered by a lift mechanism to proper molding height.

In accordance with another somewhat separate but related feature of the invention, the vertical injection molding machine is equipped with a generally circular table which rests on the stationary platen during molding. The table has a central opening. A multi-purpose spindle journaled in a spindle mounting block, in turn, mounted to the stationary platen extends through and is secured to the central opening to allow table rotation about the spindle. A lift mechanism which includes a pair of table actuators is provided radially outward from the spindle and on diametrical opposite sides thereof. Each table actuator has at least one spherical roller that is spring biased into contact with a hardened, flat circular track plate inserted in the bottom of the table. Each roller is mounted in a spring biased roller block which, in turn, is mounted in a vertically movable manner to a lift actuator block mounted to stationary platen and containing a power actuator for raising the roller mounting block. The rollers lift the table when the actuators are in an actuated position and roll on the track plate as the table is rotated about the spindle by a motor driven pinion gear meshing with a ring gear extending about the circumference of the table. Lifting the table for rotation avoids the sliding, lubricated arrangement otherwise used, thus reducing the power requirement to rotate the table and allowing heavier bottom mold halves (for increased molding tonnage) to be mounted on the table. When the table has rotated a bottom mold half to its molding station and is lowered to rest on the stationary platen, the springs in the roller block maintain the rollers in contact with the track plate to avoid roller/track damage resulting from impact which could otherwise occur when the table actuators subsequently push the table upward on the rollers.

In accordance with another aspect of the rotary table, the rotating spindle is not only hollow to permit liquid connections (for mold temperature control) to be made with the spindle to work stations on the top surface of the table, but also a plurality of hydraulic actuator connections are provided through the spindle. Within the spindle mounting block are a plurality of vertically spaced hydraulic inlet lines and a like plurality of vertically spaced hydraulic return lines, each line taking the form of a ring groove in the spindle mounting block. Each inlet line communicates with a circumferential inlet spindle groove leading to a vertically extending inlet passage formed in the wall of the hollow spindle exiting at the top surface of the table. Each return line similarly communicates with a circumferential return spindle groove leading to a vertically extending return passage formed in the wall of the hollow spindle exiting at the top surface of the table. The spindle grooves have flared openings spanning a vertical distance at least equal to the table lift travel which always remain in fluid communication with spindle mounting ring grooves. O-ring or elastomer seals between and vertically spaced from spindle grooves and spindle mounting block ring grooves prevent leakage during spindle rotation and vertical movement thereby allowing hydraulic cylinders mounted at work stations on the top of the table to be connected to the machine's hydraulic pumps with pressure controlled by the machine's programmable controller.

In general summary, the invention resides in the provision of an improved vertical injection molding machine which has the following features either alone or in combination with one another:

a) An improved lock for the movable platen having among its distinguishing features i) an always on lock for each locking rod meeting safety requirements, ii) simultaneous operation by one locking device (two locking devices per machine) for simultaneous clamping and unclamping of two locking rods, iii) floating structure allowing centering and full utilization of the spring clamping forces by four actuating rods for each locking device; and/or, iv) floating alignment bridge for locking rods to assure locking device engagement;

b) A vertical frame to i) keep low machine height for two-platen machines, ii) stably support movable platen throughout vertical travel without the need of close tolerance tubes or bushing, and/or iii) provide a convenient mount for carriage, position/reaction cylinders of injection unit;

c) A rotatable lift table to i) allow operation with heavy mold sets to utilize inherent advantages of a vertical clamp machine, ii) reduce power otherwise required to rotate table, and/or iii) provide hydraulic actuator and/or liquid connections at table center.

These and other objects of the invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and in an arrangement of certain parts taken together and in conjunction with the attached drawings which illustrate a preferred embodiment of the invention and form a part of the invention and wherein:

FIG. 12 is a partially sectioned detail showing the actuator rod connection to the connecting plate of the present invention;

FIG. 13 is a longitudinal view, partly in section, of the coupling for the high tonnage hydraulic actuator used in the present invention;

FIG. 14 is an end view of the caliper of the present invention as it would be mounted to the upper movable platen;

DETAILED DESCRIPTION OF THE INVENTION

Figure 1:
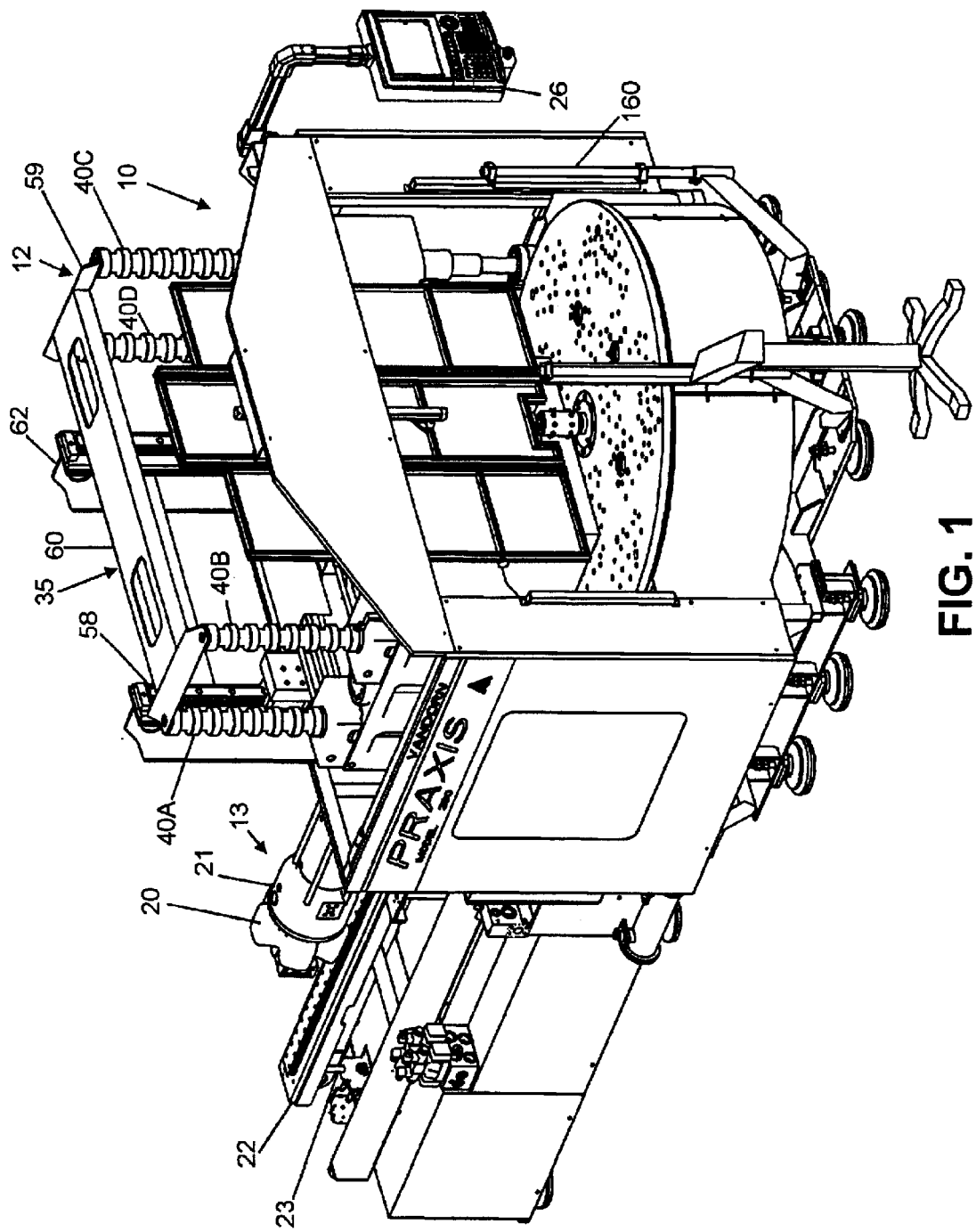
FIG. 1 is a perspective view of an injection molding machine of the present invention.
Figure 2:
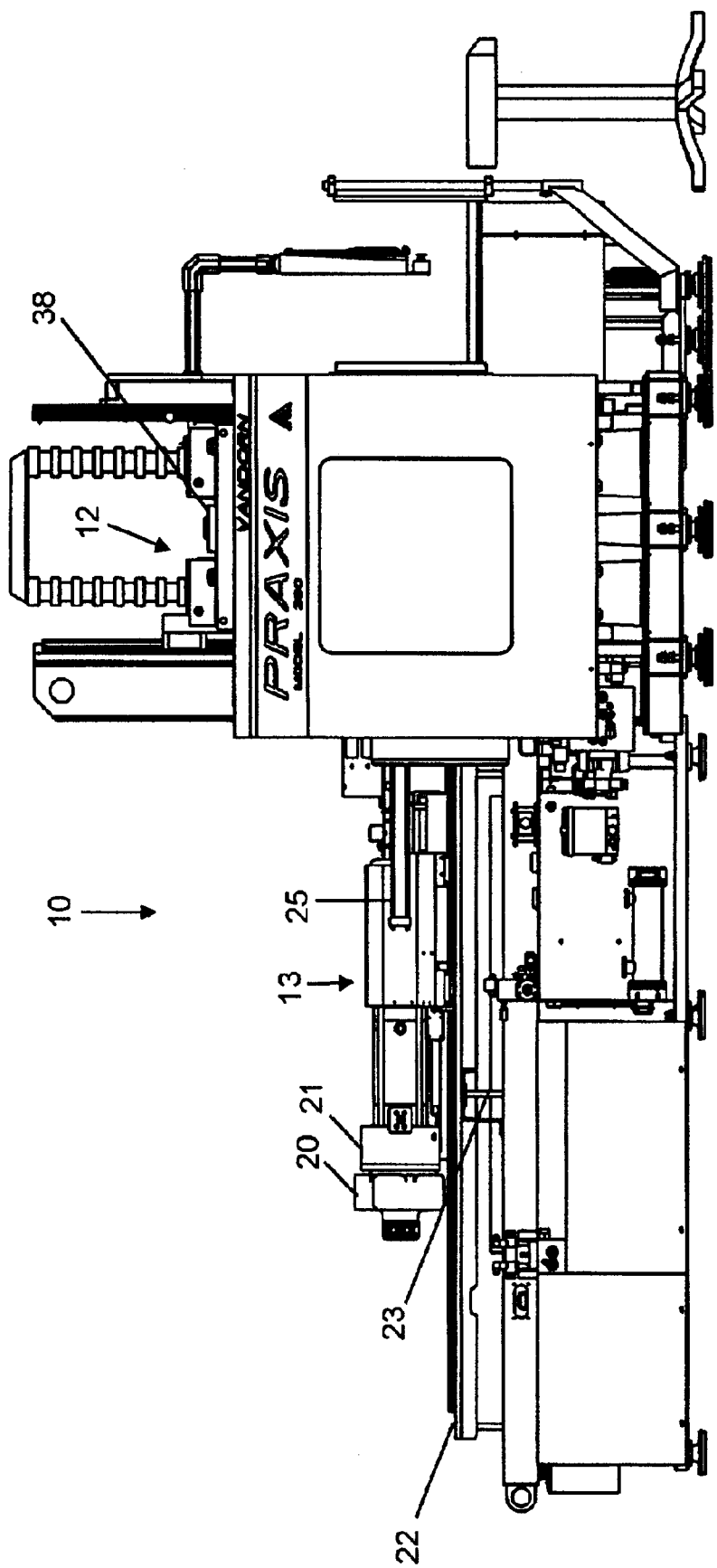
FIG. 2 is a side view of the machine shown in FIG. 1.
Figure 3:
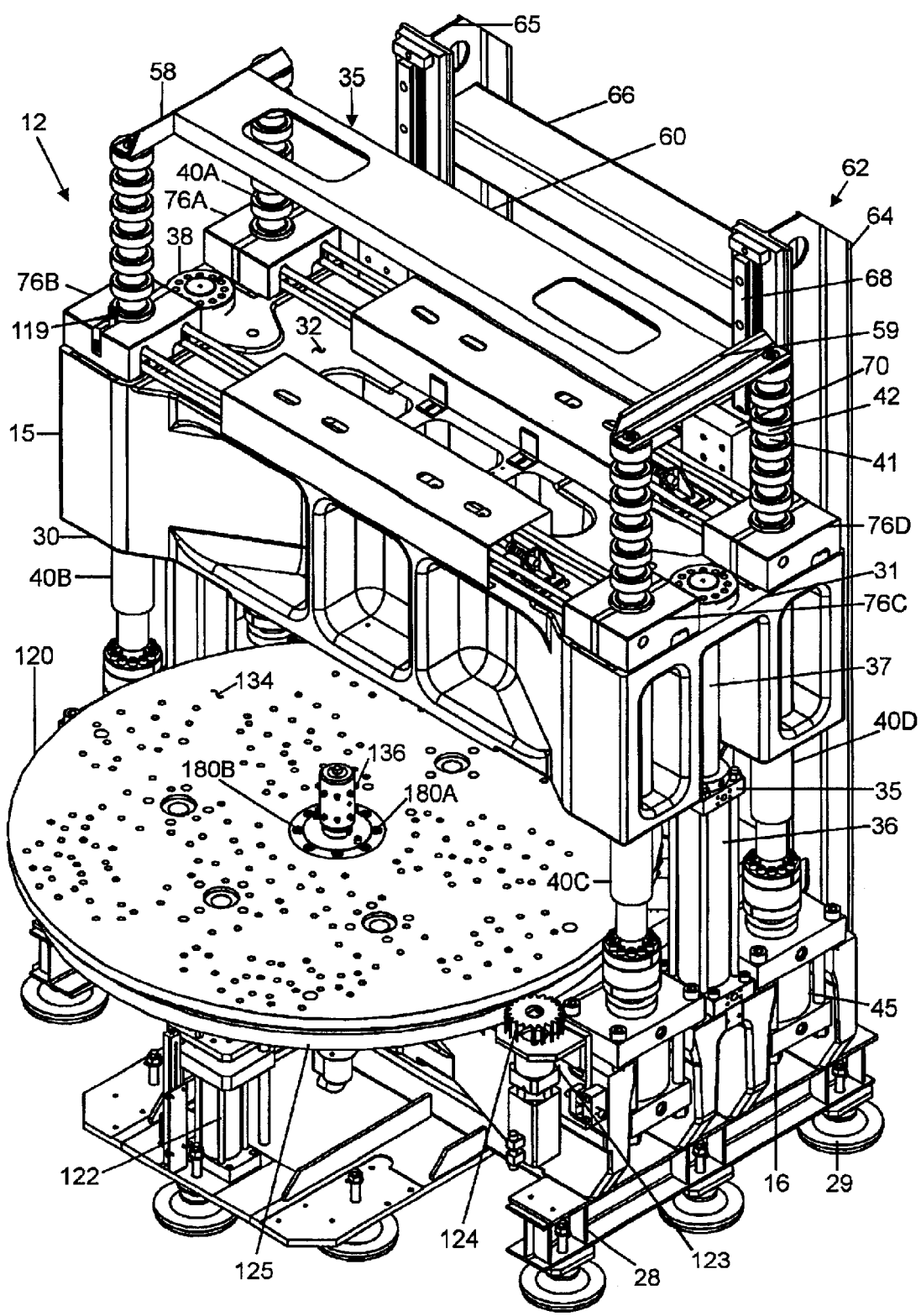
FIG. 3 is a perspective view of the vertical clamp arrangement used in the injection molding machine shown in FIG. 1.

Referring now to the drawings wherein the showings are for the purpose of illustrating a preferred embodiment of the invention only and not for the purpose of limiting the same, there is shown in FIGS. 1 and 2 an injection molding machine 10 which, basically, comprises a clamp unit 12 and an injection unit 13. Injection molding machine 10 is characterized in that clamp unit 12, as best shown in FIG. 3, is of the vertically movable type and, more particularly, is of the clamp type having an upper, vertically movable platen 15 and a lower stationary platen 16. As is well known to those skilled in the art, an upper movable mold half 17 is affixed to the bottom surface of movable platen 15 and is in a confronting molding relationship with a lower mold half 18 secured or resting on stationary platen 16 (mold halves 17, 18 shown in phantom in FIG. 4). As a matter of terminology for use in describing the features of the invention, this type of injection molding machine which has a vertically oriented clamp system 12 will be referred to as a vertical injection molding machine to more clearly distinguish the machine from the more conventional injection molding machine, which typically has a horizontal clamp longitudinally aligned with a horizontally extending injection unit.

Referring still to FIGS. 1 and 2, injection unit 13 uses a conventional, in-line reciprocating injection screw. A hydraulic motor 20 rotates the screw and a hydraulic injection unit 21 translates the screw for injection in a conventional manner. Alternatively, electric motors or servo-motors can be employed. In the preferred embodiment, injection unit 13 is mounted for horizontal movement on a carriage track 22. Carriage track 22 essentially rests on vertical carriage supports 23 which can be raised or lowered by hydraulic actuators (not shown) so that the nozzle tip of injection unit 13 is aligned with the sprue in either upper or lower mold halves 17, 18. A carriage reaction/position hydraulic piston/cylinder 25, on each side of injection unit 13 (or alternatively, a single unit), push/pull injection unit 13 on carriage track 22 so that the nozzle of the injection unit is sealed and seated into the sprue opening in a mold half. During injection, carriage piston/cylinders 25 provide the necessary reaction forces to assure development of melt pressure when the plastic melt is injected into the mold halves and held during pack. In the vertical machine, carriage piston/cylinders 25 withdraw the injection nozzle after pack to allow raising of upper mold half 17 and movement of lower mold half 18 out of the molding station (in contrast, the horizontal machine will usually maintain the injection nozzle in sealing engagement with the stationary mold half). It is to be recognized that machine 10 is equipped with a programmable controller 26 by which the operator is able to set, and the machine is able to perform, all of its molding functions.

The preferred embodiment of the invention utilizes a horizontal injection unit 13. However, certain aspects of the invention can be practiced if injection unit 13 is mounted in a vertical direction. For certain inventive aspects of the invention (i.e., the locking rod clamp arrangement and the rotary table arrangement to be discussed further below), the orientation of injection 13 can be either vertical, horizontal or any inclined angle therebetween.

Figure 4:
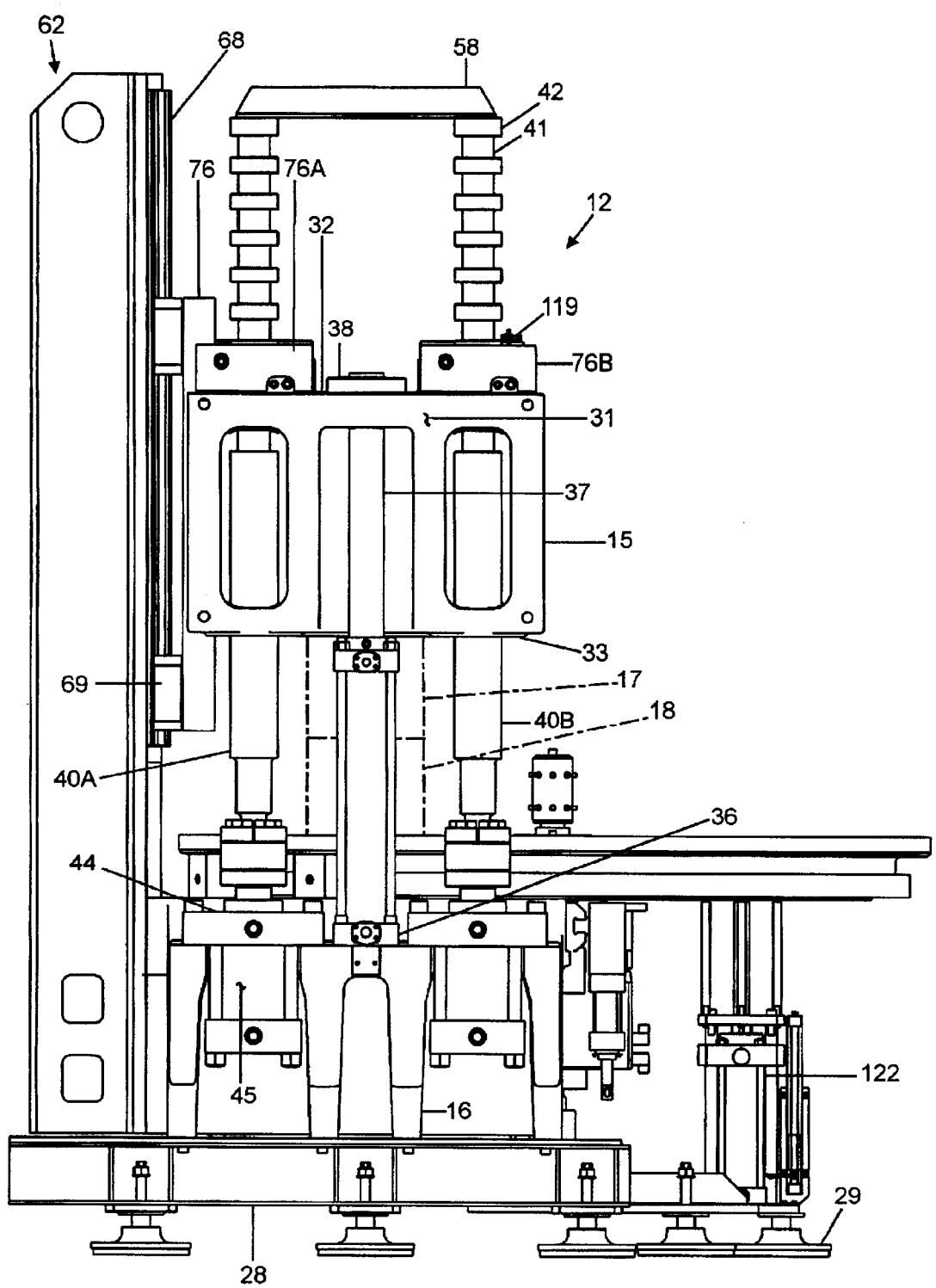
FIG. 4 is a side elevation view of the clamp mechanism shown in FIG. 3.
Figure 6:
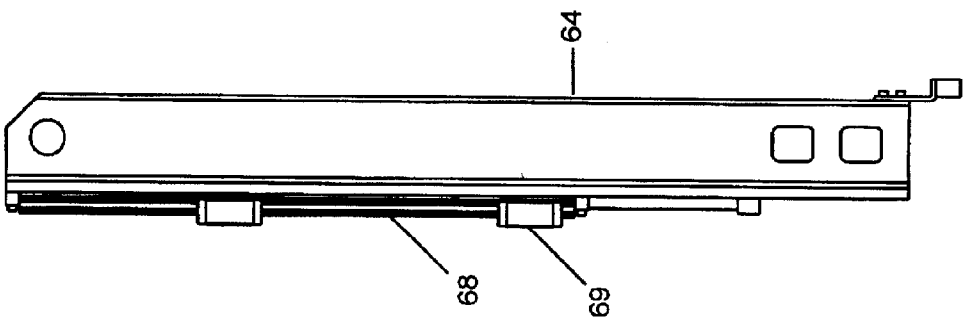
FIG. 6 is a side elevation view of the vertical frame of FIG. 5.
Figure 5:
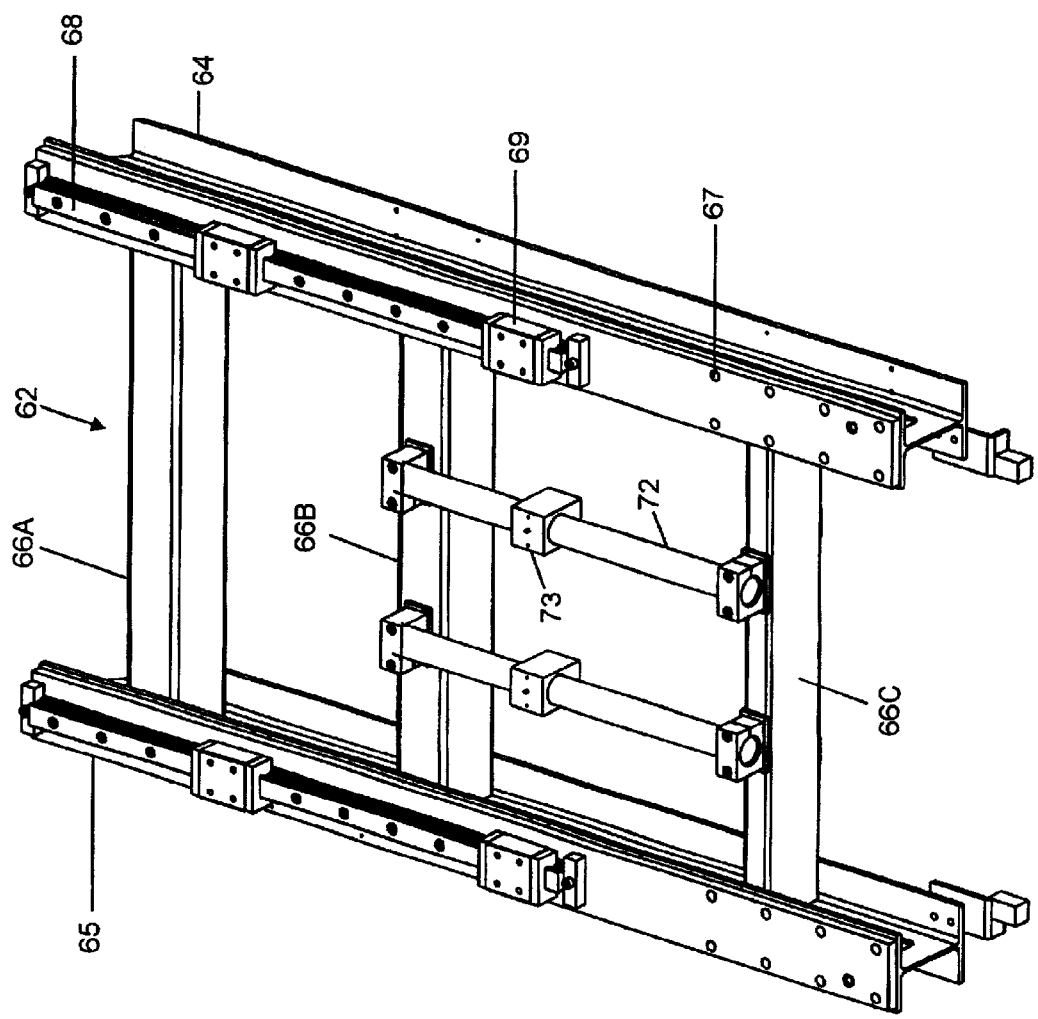
FIG. 5 is a perspective view of the vertical frame of the present invention.
Figure 7:
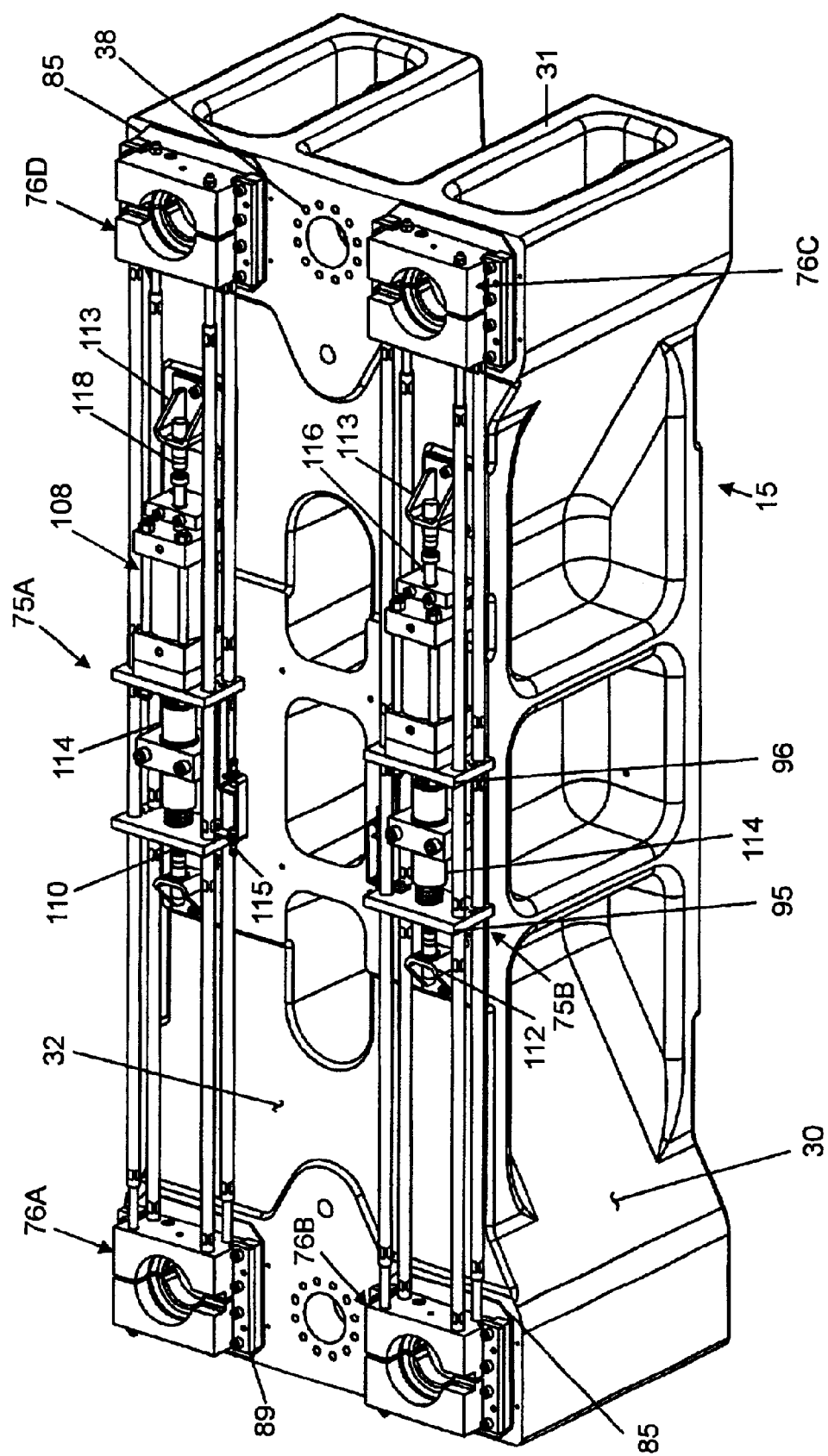
FIG. 7 is a top perspective view of the upper vertically movable platen of the present invention.

Referring now to FIGS. 3, 4, and 7, clamp unit 12 comprises a movable platen 15 and a stationary platen 16. Stationary platen 16 is a relatively large mass, rectangular shaped steel casting (or weldment) which rests on an I-beam structure 28 having leveling pads 29 in contact with or resting on the shop floor. Similarly, movable platen 15 is a relatively large, rectangular steel casting (or weldment) having long sides 30 and short sides 31 between a top surface 32 and a bottom, mold mounting surface 33.

The invention uses a two-platen clamp structured to work in a vertical injection molding machine. A pair of advance hydraulic piston/cylinders 36 are provided for lowering movable platen 15 so that upper mold half 17 nests into mating relationship with lower mold half 18 and, on completion of a mold cycle, raising movable platen 15 to allow withdrawal of lower mold half 18. The cylinder 36 of each advance hydraulic unit is mounted to a short side of stationary platen 16 and the cylinder rod 37 of each advance hydraulic unit 36 is mounted to a seat 38 in movable platen 15. Clamp tonnage is effected by locking rods 40, specifically, four locking rods in the preferred embodiment designated 40A, 40B, 40C, 40D. Each locking rod 40 has vertically spaced, annular locking rod grooves 41 between annular locking rod shoulders 42. Annular locking rod groove and shoulders 41, 42 extend from a top end of each locking rod 40 a distance sufficient to at least extend beneath top surface 32 of movable platen 15. A locking device 75, preferably a pair of locking devices 75A, 75B as explained below, is provided to selectively lock movable platen 15 to locking rods 40 by engaging an annular locking rod groove 41 and shoulder 42. The bottom end of each locking rod 40 is secured to a short stroke, high tonnage hydraulic actuator 44.

For reasons which will become clear, it is important that annular locking rod grooves 41 of all locking rods 40A–40D be maintained in vertical alignment with one another. This is accomplished by rigidly mounting the bottom end of locking rods 40 to high tonnage hydraulic clamp actuators 44. Specifically, hydraulic clamp actuators 44 are conventional, commercially available hydraulic piston/cylinder actuators which do not have to be specially fabricated for the vertical machine. Alternatively, the hydraulic clamp actuators can be specially manufactured for special application, such as high tonnage applications for which conventional actuators are not readily available. The cylinder 45 of each clamp actuator 44, as best shown in FIG. 4, is mounted at a fixed, constant elevation for all clamp actuators 44 on stationary platen 16. As best shown in FIG. 13, a piston rod 46 of hydraulic clamp actuator 44 has at its end a conventional clamping cylindrical base 48 and adjacent thereto, a conventional, annular piston rod groove 49. The lower end of each locking rod 40 is similarly formed so that at its end is a locking cylindrical base 50, and adjacent thereto, an annular locking rod groove 51. The diameter of clamping cylindrical base 48 is equal to the diameter of locking cylindrical base 50 and the diameter of piston rod groove 49 is equal to the diameter of locking rod groove 51. A first split ring 53 is applied to locking rod groove 51 and a second split ring 54 is applied to piston rod groove 49 with a spacer ring 55 therebetween. Spacer ring 55 has an inside diameter approximately equal to the diameters of clamping cylindrical base 48 and locking cylindrical base 50 with axial length equal to the combined length of bases 48, 50 abutted against one another. Fasteners 56 tighten rings 53, 54 and 55 together rigidly mounting the bottom end of each locking rod 40 to piston rod 46 of each high tonnage hydraulic clamp actuator 44.

The top end of each locking rod 40A, 40B, 40C, 40D is then fixed by a vertical aligning bridge 35, perhaps best shown in FIGS. 1 and 3. The bridge comprises a structural steel member, such as an angle iron 58, connecting the top ends of two adjacent blocking rods 40A, 40B on the short side of the rectangular movable platen 15 and a similar structural angle 59 connecting locking rods 40C, 40D on the opposite short side of the rectangle which are connected, as a single weldment, by a channel or C-shaped connecting member 60 extending along the long side of the platen's rectangular configuration. When advance actuators 36 lower movable platen 15 to establish a molding relationship between upper and lower mold halves 17, 18, high tonnage clamp actuators 44 are not pressurized. Thus, the bottom ends of locking rods 40 are somewhat free to float in a vertical direction and the locking rods 40A–40D assume a vertical relationship relative to one another (which is identical) established by vertical aligning bridge 35. It is to be noted that locking rods 40 freely pass through openings in top and bottom surfaces 32, 33 of movable platen 15, which do not perform aligning functions for locking rods 40. Parallelism and vertical alignment of locking rods 40 is maintained by aligning bridge 35 at the top end of the locking rods in combination with the rigid attachment at the bottom ends of the locking rod (FIG. 13) which permits, vis-a-vis the connection to high tonnage actuators 44, the locking rods to assume the position dictated by the alignment bridge. It is also to be noted that the aligning bridge 35 has no load bearing function either when movable platen 15 is raised or lowered by advance actuators 36 or when high tonnage clamping forces are exerted by clamp actuators 44. It should also be clear that the aligning bridge does not insure a precise, closely toleranced vertical alignment of shoulders 42 and grooves 41 of all locking rods 40A–40D. It maintains shoulders and grooves 42, 41 in reasonable alignment with one another so that locking devices 75 as described below can repeatedly function in a consistent manner.

Because tie rods, guide rods, or locking rods, are not used to guide movable platen 15, a vertical ladder frame 62 (as best shown in FIGS. 3, 4, 5 and 6) is provided for this function. Ladder frame 62 essentially comprises a right hand, vertically extending structural steel member 64, preferably an I-beam, and a left hand, vertically extending structural steel member 65, also preferably an I-beam, with a plurality of rigidizing structural steel cross-over members 66 therebetween. In the preferred embodiment, there are three cross-over members 66A, 66B and 66C, which are preferably structural members. The bottom portion of right and left hand vertical members 64, 65 have a plurality of mounting apertures 67 for mounting to stationary platen 16. Mounted to the top portion of right hand vertical member 64 is a rail 68 and an identical rail 68 is mounted to the top portion of left hand vertical member 65. Slidable on each rail 68 are two runner blocks 69. Rail 68 and runner blocks 69 are conventional rail/runner systems using ball bearings in the runner block to provide rolling friction as the block moves on a configured rail. In the preferred embodiment, a rail runner system marketed under the brand name Ball Rail® was used although any conventional guide rail may be used. Secured to the rear side of movable platen 15 and extending above top surface 32 and below bottom surface 33 of movable platen 15 is a pair of platen mounting blocks 70, each of which is in a confronting relationship with vertical support member 64 or 65. A runner block 69 is secured to mounting block 70 above top surface 32 and below bottom surface 33 of movable platen 15 to precisely and repeatedly control the position of movable platen 15 relative to stationary platen 16 as movable platen 15 is raised or lowered.

In addition, inboard of right and left hand vertical members 64, 65, is a pair of carriage guide rails 72 mounting to and vertically extending between lowest crossover member 66C and middle crossover member 66B. A slidable carriage guide block 73 is provided for each carriage guide rail 72. Mounted to each carriage guide block 73 is a carriage piston cylinder 25 and carriage guide rails 72 are laterally spaced a distance sufficient to permit the injection nozzle of injection unit 13 to extend therebetween. Alternatively, a single carriage piston cylinder can be used. Thus, vertical ladder frame 62 provides a mount for movable platen 15 allowing locking rods 40 to simply perform the locking function of the clamp without guiding while also providing a mount for the carriage actuators 25 of injection unit 13.

Referring now to FIGS. 7, 8, 9, 10, 11 and 14, top surface 32 of movable platen 15 is equipped with two locking devices 75. Each locking device 75 actuates two calipers 76.

Consistent with the terminology used before, locking device 75A actuates calipers 76A and 76D while locking device 75B actuates calipers 76B and 76C.

Figure 9:
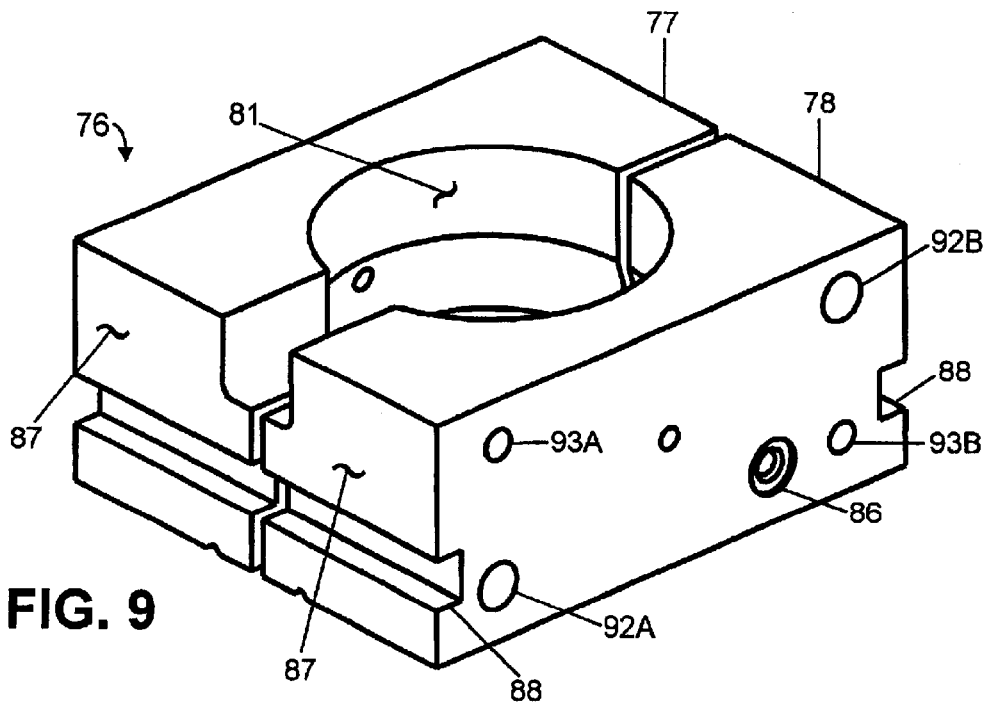
FIG. 9 is a perspective view of the caliper used in the present invention.
Figure 10:
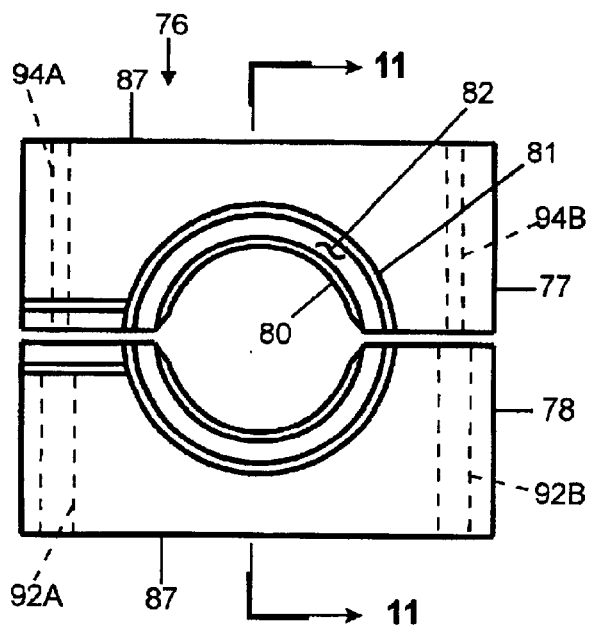
FIG. 10 is a top view of the caliper shown in FIG. 9.
Figure 11:
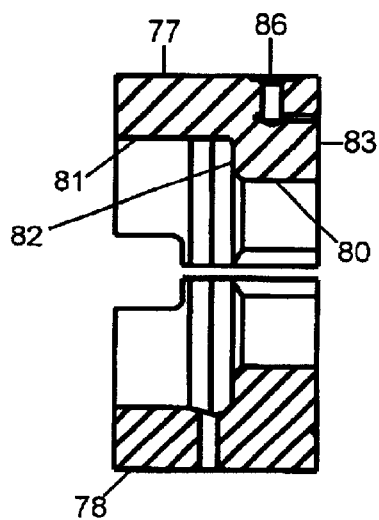
FIG. 11 is a cross-sectioned view of the caliper shown in FIG. 10 taken along lines 11—11 thereof.
Figure 15:
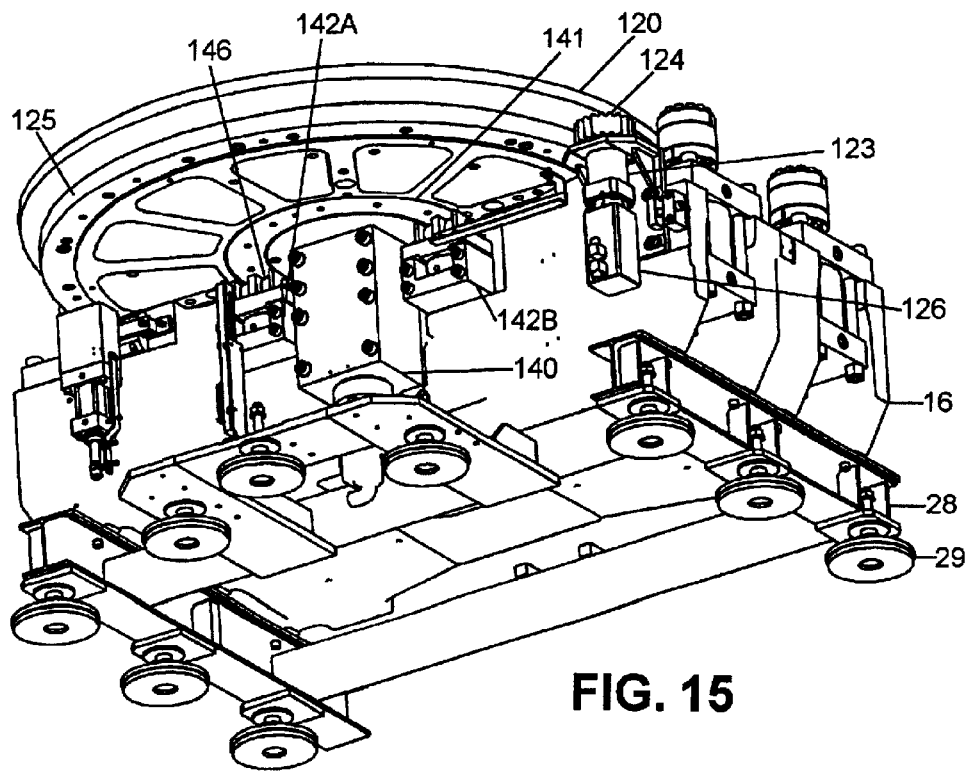
FIG. 15 is a perspective underneath view of the lower stationary platen of the present invention with some parts removed for drawing clarity.
Figure 16:
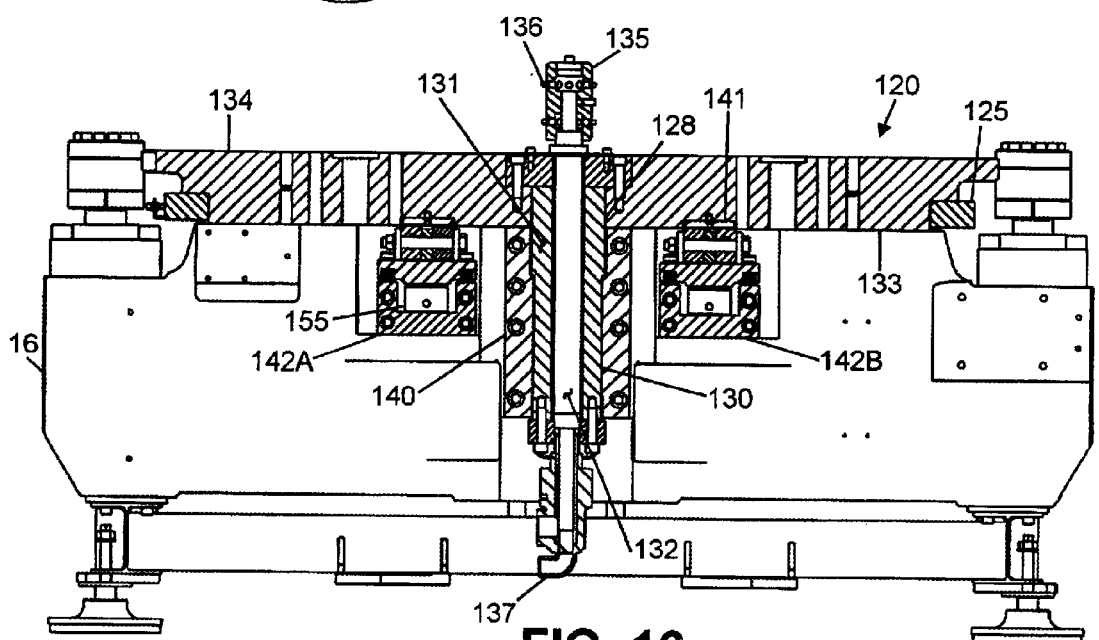
FIG. 16 is a sectioned elevation view of the lift mechanism and the rotating table of the invention taken through the center of the rotating table.

Referring more particularly to FIGS. 9, 10 and 11, each caliper 76 has an outboard caliper half 77 and an inboard caliper half 78. Each caliper half 77, 78 has at its bottom, a generally semi-circular cylindrical surface 80 with a diameter approximately equal to the diameter of locking rod groove 41. At the top portion of each caliper half 77, 78 is a top semi-circular, cylindrical surface 81 which has a diameter approximately equal to that of locking rod shoulder 42. Surfaces 80, 81 are joined at radially inward annular shoulder or protruding lock shoulder 82. When calipers 76 are actuated, inboard and outboard calipers halves 78, 77 are brought together so that semi-circular surfaces 80, 81 form cylindrical surfaces and annular surface 82 forms a radially protruding lock ring against which the radial surface of a locking rod shoulder 42 seats. As a point of reference, locking rod groove 41 adjacent the seated locking rod shoulder 42 is retained within bottom semi-circular surfaces 80 of the two caliper halves so that the next locking rod shoulder 42 adjacent the encapsulated locking rod groove 41 is adjacent bottom surface 83 of caliper 76. Thus, while the protruding lock ring 82 provides the reaction surface for high tonnage clamp forces exerted by hydraulic clamp actuators 44 when calipers 76 are closed in a locked position, movable platen 15 cannot move significantly in either a vertical up or down direction.

Referring now to FIGS. 7, 9, 11 and 14, bottom surface 83 of each caliper 76 rests on a wear plate 85 set on top surface 32 of movable platen 15. A lubrication fitting 86 is provided to enhance sliding of outboard and inboard caliper halves when wear plate 85 is lubricated. Each caliper has a long side 87 generally parallel to long sides 30 of movable platen 15 and, in the preferred embodiment, a longitudinally extending groove 88 is provided in long sides 87. A tie-down plate 89 extends into longitudinal groove 88. Tie-down plate 89 is fixed to movable platen 15 by fasteners 90 and a spacer block 91.

Referring now to FIGS. 7, 8A, 8B, 8C and 12, a description of one of the locking devices 75A will be given with the understanding that the second locking device 75B is identical to and functions in the same way as the first locking device. Locking device 75 includes a piston rod connector plate 95 and a cylinder connector plate 96 which are generally identical to one another, rectangular in configuration and have four holes at their corners of specific size.

Referring to FIGS. 9 and 10, inboard caliper half 78, as shown, has two threaded holes 93A, 93B and two through holes 92A, 92B. Outboard caliper half 77 has only two through holes 94A, 94B which are aligned with through holes 92A, 92B, respectively, but of slightly smaller diameter. Outboard through holes 94A, 94B do not appear in FIG. 9 and are drawn in dashed line in FIG. 10. Each locking device 75 has four actuator rods 98 and each actuator rod, in turn, is made up of a long rod segment 99 and a short rod segment 100. For explanatory purposes, each short segment has a threaded caliper end which is threaded into one of the threaded holes 93A, 93B of an inboard caliper half 78. Each long rod segment 99 has a threaded caliper end which extends as a stud having diameter less than the diameter of long rod segment 99, so that an annular shoulder is formed where the stud starts. The long rod segment 99 extends through one of the caliper through holes 92A, 92B in inboard caliper half 78 and the threaded stud end extends through one of the through holes 94A, 94B in outboard caliper half 77 where it is fastened with a stop lock nut 101 at the outside of outboard caliper half 77. When lock nut 101 is tightened the threaded end of long rod segment 99 is firmly fixed by stud shoulder and lock nut to outboard caliper half 77 so that movement of long rod segment 99 in one direction opens outboard caliper half 77 and movement in the opposite direction closes outboard caliper half 77. The free end of long rod segment 99, which is not secured to a caliper half, and the free end of short rod segment 100, which is not secured to a caliper half, are joined together to form actuator rod 98 while being pinned to either a piston rod connector plate 95 or a cylinder connector plate 96 in the manner shown in FIG. 12. As shown in FIG. 12, one of the free ends has a threaded stud 103 which is threaded into a threaded hole 104 at the free end of the other rod segment and both rod segments abut opposite face surfaces of either piston rod connector plate 95 or cylinder connector plate 96.

Figure 8A:
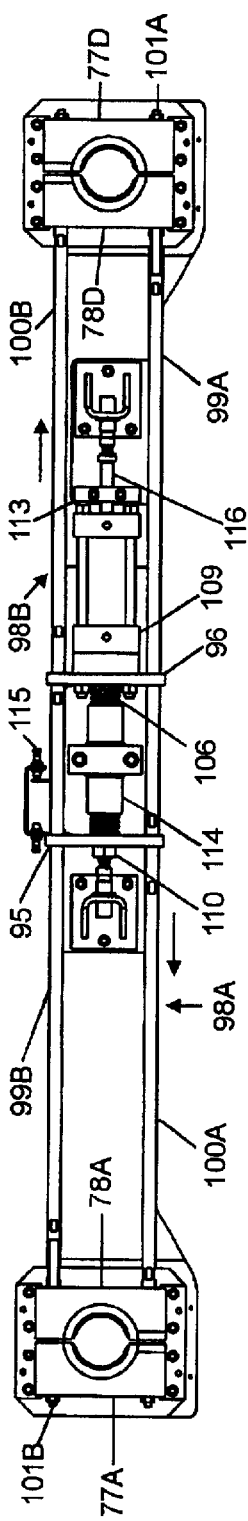
FIG. 8A is a top view of the locking device of the present invention shown in its locked actuated position.
Figure 8B:
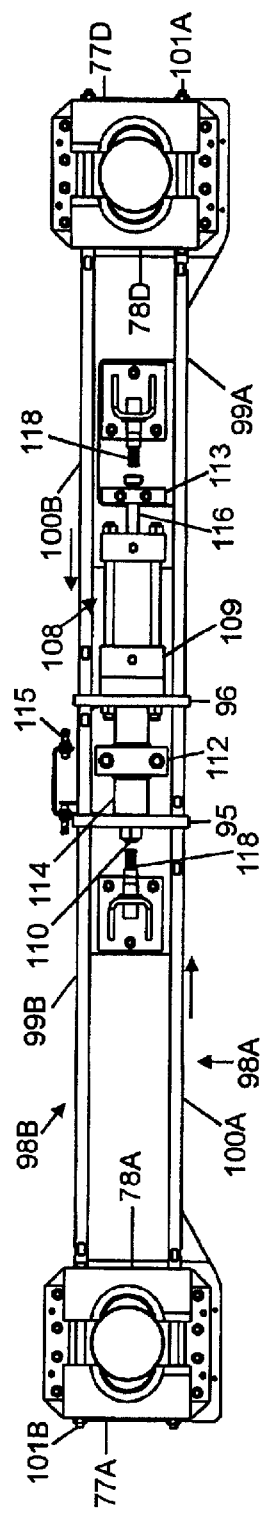
FIG. 8B is a top view of the locking device of the present invention shown in its unlocked, unactuated condition.

Referring specifically to the plan views of FIGS. 8A and 8B, on the top side of locking device 75A is an actuating rod 98B which has a threaded stud end on long segment 99B that extends through a through hole 92B in inboard caliper half 78A, through through hole 94B in outboard caliper half 77A and locked by nut 101B to outboard caliper half 77A. Short rod segment 100B of actuating rod 98B has a threaded end secured to threaded hole 93A in inboard caliper half 78D. The free ends of long rod segment 99B and short rod segment 100B are joined together as shown in FIG. 12 at cylinder connector plate 96. Long rod segment 99B extends through an opening (not shown) in piston rod connector plate 95 which is larger in diameter than the diameter of long rod segment 99B so piston rod connector plate 95 can slide relative to actuator rod 98B. As noted, cylinder connector plate 96 is fixed to actuator rod 98B so that movement of cylinder connector plate 96 will result in movement of actuator rod 98B.

On the bottom side of locking device 75 shown in FIGS. 8A and 8B is an actuator rod 98A. Long rod segment 99A extends through through hole 92B in inboard caliper half 78D. The stud end extends through through hole 94B in outboard caliper half 77D and the stud end is locked in outboard caliper half 77D by lock nut 101A. Short rod segment 100A has a threaded end which is in threaded engagement with threaded hole 93A in inboard caliper half 78A. The free ends of long and short rod segments 99A and 100A are joined together as shown in FIG. 12 at piston rod connector plate 95. The hole in cylinder connector plate 96 through which long rod segment 99A extends is greater in diameter than that of long rod segment 99A so that actuator rod 98A can slide relative to cylinder connector plate 96. However, actuator rod 98A is fixed to piston rod connector plate 95 and when piston rod connector plate 95 moves, actuator rod 98A moves along with piston rod connector plate 95.

Figure 8C:
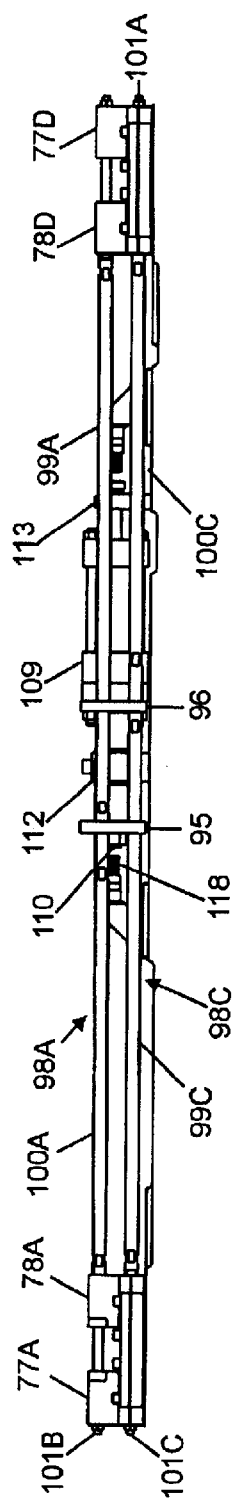
FIG. 8C is a side view of the locking device of the present invention shown in its unlocked, unactuated condition.

There are also two lower actuator rods beneath the upper actuator rods 98A, 98B described with reference to FIGS. 8A and 8B. Lower actuator rod 98C is shown in FIG. 8C and has a long rod segment 99C extending through through hole 92A in inboard caliper half 78A, with its stud end extending through through hole 94A in outboard caliper half 77A where it is locked by lock nut 101C to outboard caliper half 77A. Lower actuator rod 98C has a short rod segment 100C threaded into threaded hole 93B in inboard caliper half 78D. Long and short rod segments 99C and 100C are connected to cylinder connector plate 96 and long rod segment 99C freely floats in a hole provided in piston rod connector plate 95.

Fundamentally, a spring 106, preferably a compression spring, is positioned between piston rod connector plate 95 and cylinder rod connector plate 96 as shown in FIG. 8A and moves cylinder connector plates 96, 95. Cylinder connector plate 96 moves in the direction shown in the top arrow drawn in FIG. 8A and carries with its movement, actuator rod 98B with the result that short rod segment 100B pushes inboard caliper half 78D towards outboard caliper half 77D while long rod segment 99B pulls outboard caliper half 77A towards inboard caliper half 78A. At the same time, compressive spring 106 pushes piston rod connector plate 95 in the direction of the bottom arrow shown in FIG. 8A with the result that short rod segment 100A pushes inboard caliper half 78A towards outboard caliper half 77A while long rod segment 99A pulls outboard caliper half 77D towards inboard caliper half 78D. Similar actions occur for the lower actuator rods 98C, 98D so that the lower and upper actuator rods 98 on each side push inboard caliper half 78 to outboard caliper half 77 and pull outboard caliper half 77 towards inboard caliper half 78. The result is a clamp for locking of locking rods 40A, 40D by locking device 75A. Note that as described, piston rod connector plate 95 and cylinder connector plate 96 are free to float and that while actuator rods 98 are pinned at their ends to a caliper half and to one of the connector plates, their long length in combination with the floating features of the connector plates (and to some extent the floating features of the caliper half mountings as described) permit actuator rods to "center" themselves. This centering is assisted by mounting bracket 112 and spacer 114. The result is that the compressive force of spring 106 is almost entirely exerted in a horizontal direction allowing almost complete utilization of the spring force to effect clamping while avoiding tendency of actuator rods 98 to stick or bind. The spring compressive force is always "on" so the normal state of locking device 75 is a clamp or a "lock on" for locking rods 40. Thus, safety regulations which require that movable platen 15 be locked or immovable in the event of a power failure, triggering of a safety alarm, etc. is satisfied by locking devices 75A, 75B.

In order to allow locking devices 75 to release clamping of locking rods 40, an opening mechanism in the form of a release cylinder/piston (hydraulic or pneumatic actuators) 108 is provided. (Conceivably, an electric motor can be used.) The cylinder 109 of release hydraulic actuator 108 is fixed to cylinder connector plate 96 and the piston rod 110 of release hydraulic actuator 108 is fixed to piston rod connector plate 95. When release hydraulic actuator 108 is pressurized, piston 110 is withdrawn into cylinder 109 causing connector plates 95, 96 to move towards one another as shown in FIGS. 8B and 8C and reversing the motion of actuator rods 98. As shown in FIG. 8B, cylinder connector plate moves in the direction of the top arrow causing short rod segment 100B to pull inboard caliper half 78D away from outboard caliper half 77D and long rod segment 99B to push outboard caliper half 77A away from inboard caliper half 78A. Similarly, piston rod connector plate 95 moves in the direction of bottom arrow causing short rod segment 100A to pull inboard caliper half 78A away from outboard caliper half 77A and push outboard caliper half 77D away from inboard caliper half 78D.

Release hydraulic actuator 108 is mounted in a floating fashion to top surface 32 of movable platen 15 by a piston rod mounting bracket 112 which is threaded into movable platen 15 and which has a central opening through which piston rod 110 slidably extends. In the preferred embodiment, compressive spring 106 takes the form of two separate springs. One spring is compressed between piston rod mounting bracket 112 and cylinder connector plate 96 and the other spring is compressed between piston rod mounting bracket 112 and piston rod connector plate 95. Each spring is received within a pipe spacer section 114 to prevent bottoming out of the spring which defines the caliper opening stroke. A cylinder support rod 116 is formed as part of cylinder 109 and a cylinder rod mounting bracket 113 is mounted to upper vertically movable platen 15 and, like piston rod mounting bracket 112, has a central opening through which cylinder support rod 116 slidably extends. Thus, piston rod mounting bracket 112 and cylinder rod mounting bracket 113 slidably mount hydraulic actuator 108 to upper movable platen 115. To prevent shock or impact loading when pressure in release hydraulic actuator 108 is reduced and locking devices 75 are actuated, a dash-pot or hydraulic shock absorber 118 is provided to contact piston rod 110 and cylinder support rod 116.

At the completion of a molding cycle, hydraulic actuators 108 are pressurized to pull connector plates 95, 96 together and release calipers 76 from engaging locking rods 40. Advance hydraulic piston/cylinders 36 raise movable platen 15 and upper movable mold half 17 out of molding relationship with lower mold half 18. Any mechanism can now be used to either move lower mold half 18 away from its position underneath movable platen 15 or any appropriate mechanism can be employed to simply remove the molded part from the lower mold half 18 while it remains in place. When the machine is ready for its next cycle, advance hydraulic piston/cylinders 36 lower movable platen 15 into molding relationship with the now ready lower mold half 18. The lowering continues until the mold is closed. If necessary, tonnage cylinders would be actuated in order for the locking rods to be positioned in proper height location to enable the calipers to lockingly engage locking rods. In the preferred embodiment, two proximity switches are used in one caliper 76 to determine that two adjacent locking rod shoulders 42 are sensed. Thus, the position of locking rod groove 41 is precisely sensed to be at the position of caliper cylindrical surface 80. At this point, aligning bridge 35 assures that all locking rods 40A–40D have locking rod grooves and shoulders 41, 42 reasonably within outboard and inboard caliper halves 77, 78. Pressure to release hydraulic actuators 108 is reduced and springs 106 cause locking devices 75 to close calipers 76A–76D and clamp or lock locking rods 40A–40D in the manner described above. In the preferred embodiment, a proximity switch arrangement 119 is required for only one caliper. However, switches can be used for 2, 3 or even all 4 calipers.

One of the advantages of the vertical injection molding machine is that it may be optionally equipped with a rotating table 120 which rests on stationary platen 16. The general concept is that two or more lower mold halves 18 are mounted at fixed positions on rotating table 120. One of the lower mold halves 18 is positioned by table rotation to be aligned with upper movable mold half 17. In a normal injection cycle, the mold is clamped, molding material injected, packed, cooled, unclamped and ejected, whereupon the cycle repeats. With the machine equipped with rotary table 120, once the pack cycle is completed, upper mold half 17 can move out of molding relation with lower mold half 18 and table 120 rotated or indexed so that another lower mold half 18 may be positioned for the next cycle. Cooling or solidification of the molding material in the lower mold half 18 continues while the table indexes to another station which may contain, for example, an ejector mechanism 122 which pushes ejector pins from underneath table 120 to dislodge the molded part from lower mold half 18 where robotic arms can then remove the part. At the same station, or at a different station, inserts may be placed, again usually by robotic arm, into the now emptied lower mold half 18 to ready it for injection. Rotation of table 120 is powered by an electric or hydraulic drive motor 123 having a pinion gear 124 in toothed engagement with a ring gear 125 (ring teeth not shown for drawing clarity) on rotating table 120. Rotating table 120 has to rest on stationary platen 16 so that the clamping forces from high tonnage hydraulic actuators 44 can be transmitted to stationary platen 16. Typically, a lubricated wear plate is provided between the upper surface of stationary platen 16 and the lower surface of rotating table 120 so that electric drive motor 123 can rotate table 120 in sliding contact with stationary platen 16. Lubrication is a maintenance problem because the space is hard to gain access to. More importantly, when heavy mold halves are mounted to the top surface of rotating table 120, an excessive amount of power is required to rotate the table. This means a large motor must be provided.

Referring now to FIGS. 15–20, fixed to a center opening 128 in rotating table 120 so as to be rotatable therewith, such as by a press fit or otherwise, is a multipurpose spindle 130. Spindle 130 is a hollow cylinder defined by a vertically extending annular wall 131, in turn, defining a vertical bore 132 therein. Spindle 130 extends above top surface 134 of rotating table 120 and vertical bore 132 extends above table top surface 134 whereat it is closed. A distribution collar 135 fits over the top end of spindle 130 above table top surface 134 and is provided with a plurality of liquid supply connections 136 in fluid communication with vertical bore 132. A liquid supply tube 137 is provided at the bottom end of vertical bore 132 and is in sealing sliding contact therewith. Spindle 130 is supported for rotation, or is journaled, in a spindle mounting block 140 which, in turn, is mounted to stationary platen 16. As described thus far, table 120 is somewhat conventional.

Figure 17:
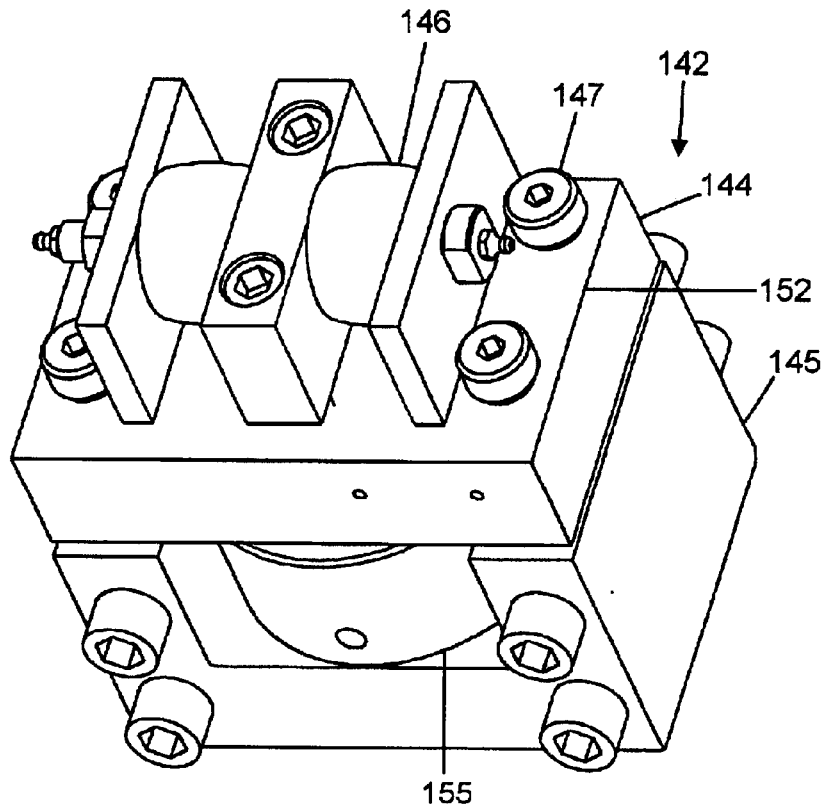
FIG. 17 is a perspective view of one of the table actuators used in the present invention.
Figure 18:
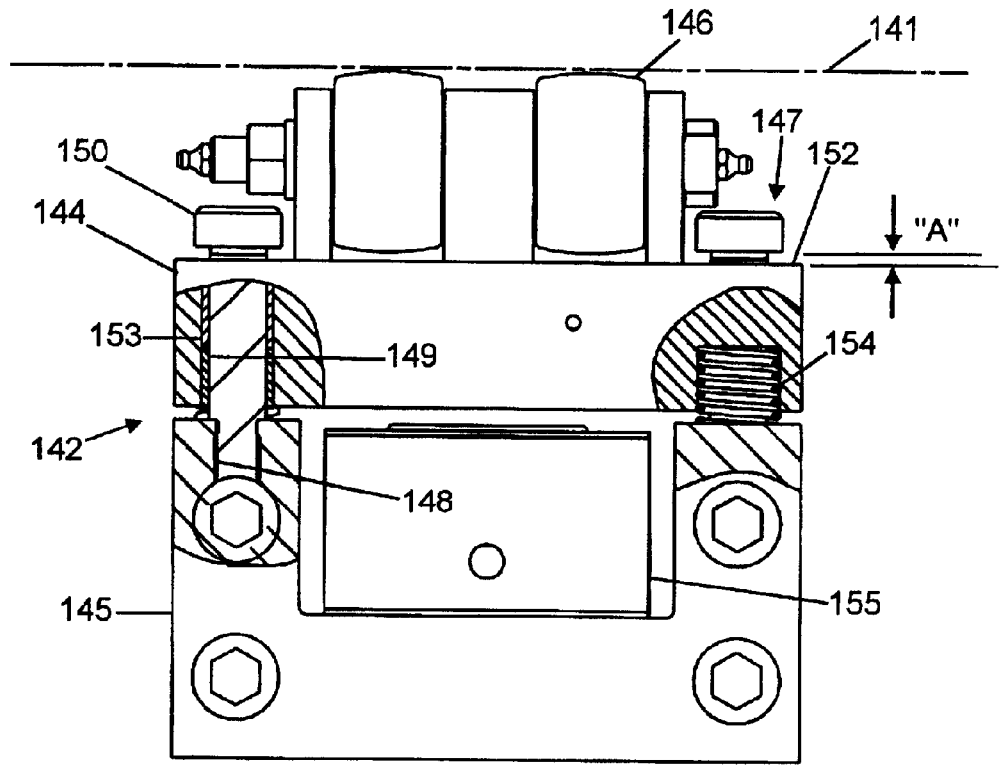
FIG. 18 is an elevation view of the table actuator shown in FIG. 17 partially in section; and, FIGS. 19A and 19B are elevation views of the bottom portion of the spindle mechanism with the table in a down and an up position, respectively.

At the table's underside surface 133 is an annular roller track 141 spaced radially outward from spindle mounting block 140 which it circumscribes. Mounted in roller track 141 is a hardened, flat roller track wear plate and reference to roller track 141 means the hardened wear plate in the track or variation thereof (conceivably, the track, per se, could be heat treated such as by flame hardening to avoid a track plate). In contact with roller track 141 are identical first and second lift mechanisms designated by reference numerals 142A, 142B, each of which are mounted to stationary platen 16. Reference should be had to FIGS. 17 and 18 which show in greater detail lift mechanism 142 which comprises a roller block 144 mounted to a lift actuator block 145 which, in turn, is fixed to stationary platen 16. Roller block 144 contains a pair of spherical rollers 146 journaled for rotation as shown. Roller block 144 is secured to lift actuator block 145 by four cap screws 147 which have a threaded end 148, a smooth shank 149 and a bolt head 150 which extends a set distance above a bolt mounting surface 152 on roller block 144. A bushing 153 allows for closely toleranced vertical movement of roller block 144 relative to lift actuator block 145. A plurality of springs 154 between roller block 144 and lift actuator block 145 lifts roller block 144 off lift actuator block 145 so that spherical rollers 146 are always maintained in contact with roller track 141. A hydraulic lift actuator 155 is provided for raising roller block 144 off lift actuator block 145. When hydraulic lift actuator 155 is actuated, rotating table 120 is lifted off of stationary platen 16 for rotation of lower mold halves 18 on the table to various work station positions. Referring still to FIG. 18, the position of lift mechanism 142 is shown with rotating table 120 at a rest position on stationary platen 16 and hydraulic lift actuator 155 in an off or unactuated position. In this condition, springs 154 insure that spherical rollers 146 are in contact with the hardened wear plate forming annular roller track 142. When hydraulic lift actuator 155 is actuated, roller block 144 will vertically move upwards a distance indicated by dimension "A" in FIG. 18, which, in the preferred embodiment, is about 5 mm. By maintaining rollers 146 in contact with roller track 141 at all times, an impact force otherwise produced by hydraulic lift actuator 155 is avoided and inadvertent track or roller wear or markings or even fractures or cracks are minimized.

Spindle 130 is also equipped with provisions for supplying hydraulic actuator circuits from the machine pumps which can be tapped from the table center. Hydraulic connections for inlet and return on table top surface 134 are shown by reference numeral 180 (FIG. 3). In the preferred embodiment, three hydraulic circuits, each having inlet and return connections, are provided in spindle 130/table 120. Provisions for hydraulic circuits threaded through the table center have been provided for in prior art machines. However, the spindle in prior art machines did not rotate and vertically move.

Figure 19A:
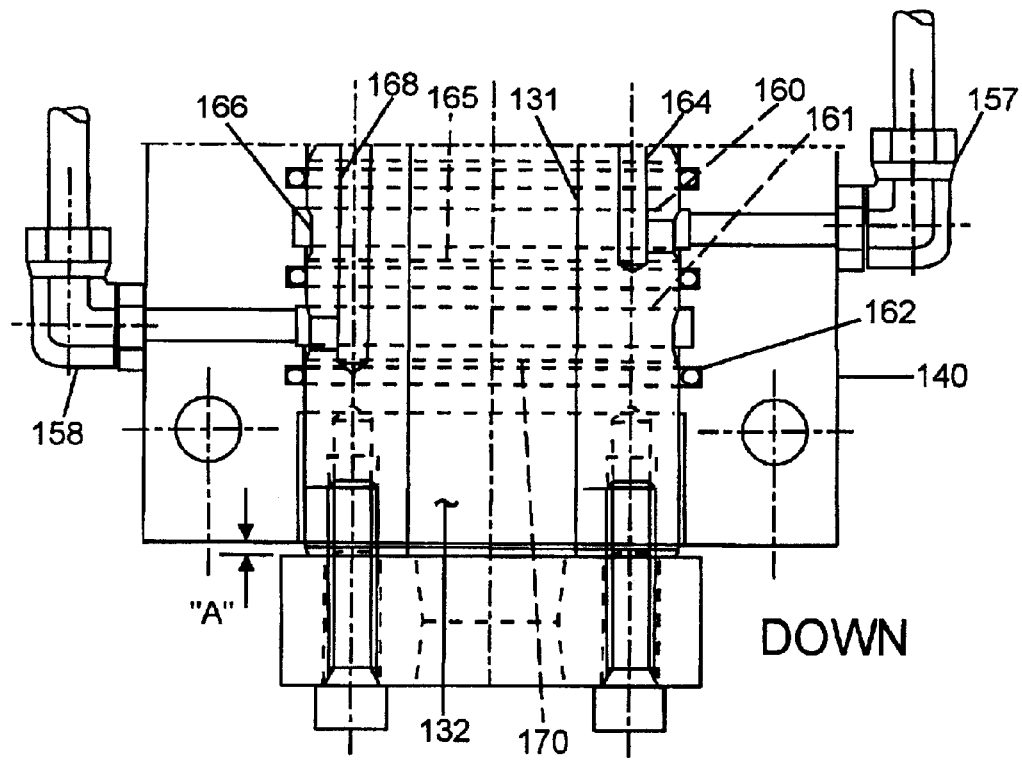
Figure 19B:
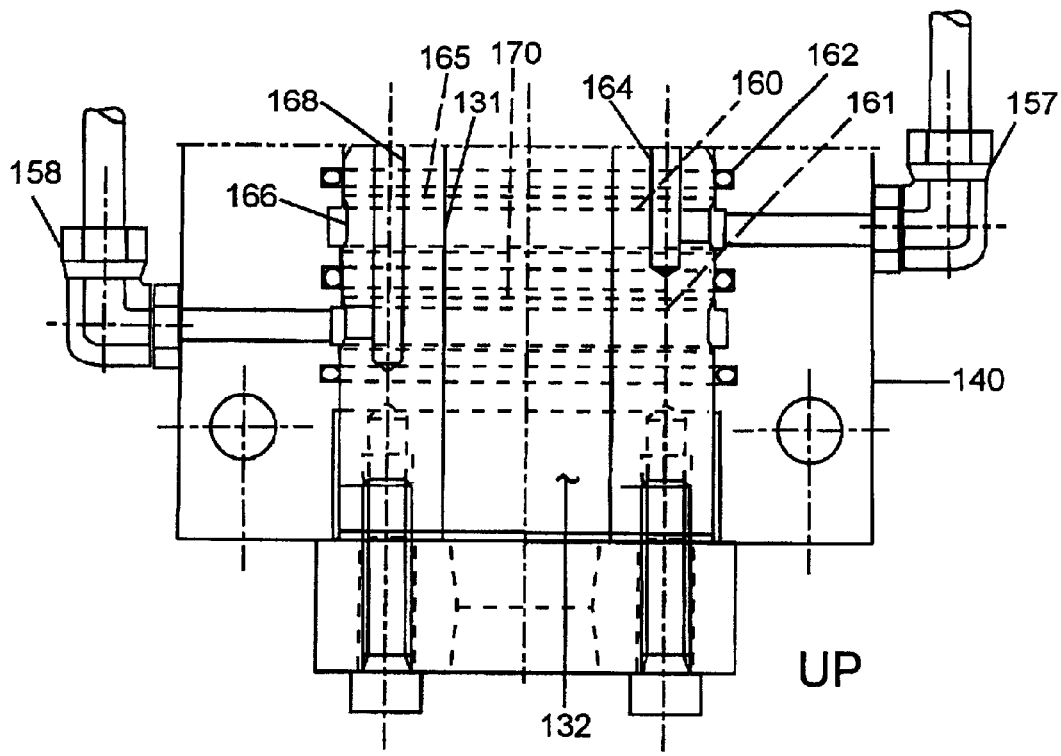

To provide a means for effectively sealing the hydraulic circuits in spindle 130, an arrangement was developed, as depicted in FIGS. 19A and 19B, which show only the bottom portion of spindle 130 and spindle mounting block 140 and the plumbing for one circuit having a hydraulic inlet fitting 157 and a hydraulic return fitting 158. FIG. 19A shows the position of spindle 130 in spindle mounting block 140 when table 120 is resting on stationary platen 16. When the table is raised up for rotation, spindle 130 moves upward relative to spindle mounting block 140 (which, as noted, is fixed to stationary platen 16) and is shown in FIG. 19B.

Inlet fitting 157 communicates with a stationary circular inlet groove 160 formed in spindle mounting block 140. Outlet fitting 158 communicates with a stationary circular return groove 161 also formed in spindle mounting block 140. Between and adjacent stationary grooves 160, 161 is an O-ring 162 within O-ring grooves that are also formed in stationary mounting block 140. In annular wall 131 of spindle 130 is a drilled inlet hole 164 which extends upward to a corresponding hydraulic connection 180A on table top surface 134 and extends downward where it opens to a spindle inlet groove 165 formed in the outer surface of spindle annular wall 131. Spindle inlet groove 165 is flared as shown by reference numeral 166 so that it extends a distance equal to the vertical distance of stationary circular inlet groove 160 plus the vertical travel of table 120 which is shown by the "A dimension" and in the preferred embodiment is 5 mm. Similarly, a drilled return hole 168 is also provided which at its top end communicates with a hydraulic connection 180B on table top surface 134 and at its bottom end is in fluid communication with a spindle return groove 170. Spindle return groove is also flared to extend the same vertical distance as spindle inlet groove 165. It is understood that drilled inlet and return holes 164, 168 and inlet and return connections 180A, 180B are circumferentially spaced relative to one another to fit within desired clearances and that the second set of hydraulic connections may be rotatably offset relative to the first set of connections. The size and spacing of inlet and return grooves 160, 161, 165 170 is such that O-ring seals 160 are always exposed to a smooth cylindrical surface on the outer portion of spindle annular wall 131 so that the flared configuration 166 of the spindle inlet and return grooves 165, 170 do not adversely affect the sealing of O-rings 162. Spacing to insure sealing is important because the spindle is rotating and vertically moving. Lower stationary mold halves typically use hydraulic actuators to set inserts into the mold after part ejection. It is not desirable for the hydraulic lines to extend off the table. As shown in FIGS. 1 and 2, the machine is equipped with electron beams 160 to protect the operator from reaching onto table 120 when the machine is operating. By providing the hydraulic circuits from the table center, the fluid is supplied by the machine's pumps and the supply and pressure of the supplied fluid can be easily controlled by the operator through programmable controller 26.

The invention has been described with reference to a preferred and alternative embodiments. Obviously, alterations and modifications will occur to those skilled in the art upon reading and understanding the Detailed Description of the Invention set forth above. It is intended to include all such modifications and alterations insofar as they come within the scope of the invention.

Having thus defined the invention, it is claimed:

1. An injection molding machine comprising:
   a) a stationary base platen upon which a lower mold half is mounted;
   b) a vertically moveable platen on the bottom side of which is mounted an upper mold half in confronting relation to said bottom mold half;
   c) an advance mechanism for raising and lowering said moveable platen relative to said stationary platen;
   d) an injection unit for injecting molding material into one of said mold halves when said mold halves have been moved into a molding relationship;
   e) a plurality of vertically extending locking rods positioned to straddle said mold halves, each locking rod being attached at one end thereof to said lower stationary platen, extending through a locking rod opening in said moveable platen, and having a plurality of longitudinally spaced annular locking grooves extending over a distance adjacent the opposite locking rod end to a position at least adjacent said moveable platen;
   f) a locking device having a locked and an unlocked position on the top surface of said moveable platen for locking said moveable platen at a set distance from said stationary platen, said locking device including;
      i) a caliper for each locking rod having inboard and outboard caliper halves, each caliper half having a generally semi-circular, radially inward protruding lock ring adapted to fit within a locking groove when said inboard and outboard caliper halves are moved together to form a generally circular locking ring;
      ii) first and second actuating rods, said first rod secured to said inboard caliper half of a first caliper at one end thereof and to said outboard caliper half of a second caliper at its opposite end, said second actuating rod secured to said outboard caliper half of said second caliper at one end thereof and to said inboard caliper half of said first caliper at its opposite end;
      iii) a piston rod connector plate and a cylinder connector plate, said piston rod connector plate secured to said first actuating rod at a first distance between the ends of said first actuating rod and through which said first actuating rod extends, said piston rod connector plate having a first opening slidably receiving said second actuating rod; said cylinder connector plate fixed to said second actuating rod at a second distance between the ends of said second actuating rod and through which said second actuating rod extends, said cylinder connector plate having an opening slidably receiving said first actuating rod;
      iv) a compression spring between said piston rod connector plate and said cylinder connector plate simultaneously biasing said inboard and outboard caliper halves of said first and second calipers to a closed position; and,
      v) an opening mechanism attached to said piston rod connector plate and to said cylinder connector plate for drawing said connector plates towards one another to simultaneously open said inboard and outboard caliper halves of said first and second calipers against the bias of said compression spring.

2. The machine of claim 1 wherein said moveable platen being generally rectangular in configuration having long longitudinally extending sides and short sides with a locking device adjacent a long side on said top surface of said movable platen so that said machine has two locking devices and said first and second calipers of each locking device assembly at opposite corners of a long side so that each machine has four locking rods;

said opening mechanism includes a piston moveable within a cylinder housing mounted to said cylinder connector plate; said piston having a piston rod extending therefrom mounted to said piston rod connector plate, said cylinder housing having a cylinder stop rod protruding in an opposite direction from said piston rod;

a piston rod mounting bracket secured to said moveable platen through which said piston rod slidably extends and a cylinder rod mounting bracket secured to said moveable platen through which said cylinder rod slidably extends; and, said actuating rods connected only to said caliper halves and to said connector plates in turn connected only to said opening mechanism whereby the position of said actuator rods can float relative to said movable platen during actuation of said rods to assure positive opening and closing of said locking device.

3. The machine of claim 2 wherein each actuating rod includes long and short rod components, one of said rod components having at one end thereof a shoulder from which a threaded end protrudes and the other rod component includes a shoulder having a threaded opening therein, and each actuating rod secured to its respective connector plate by placing said threaded end of one of said rod components into engagement with said threaded end opening of the other one of said rod components such that said shoulders engage opposite sides of said connector plate.

4. The machine of claim 2 wherein each caliper has a long side generally parallel to said long side of said movable platen and any given caliper having an actuating rod secured to an outboard caliper half and an actuating rod secured to an inboard caliper half adjacent one long caliper side while an actuating rod secured to an inboard caliper half and an actuating rod secured to an outboard caliper half is adjacent the opposite long caliper side whereby even clamping forces are distributed by said locking rods to each caliper.

5. The machine of claim 4 further including a caliper clamp block secured to said movable platen adjacent a long side of each caliper and being the only attachment of said caliper to said movable platen; one of said caliper and said caliper clamp having a longitudinally extending groove and the other one of said caliper and said caliper clamp having a protrusion slidable in said groove, and a lubricated wear plate between each caliper and said movable platen.

6. The machine of claim 4 further including a first shock absorber adjacent said plunger rod and a second shock absorber adjacent said cylinder stop rod, said shock absorbers contacted by said plunger rod and by said cylinder stop rod when said locking device assembly moves from its unlocked to its locked condition.

7. The machine of claim 1 further including a clamping piston cylinder mounted to said stationary platen for each locking rod with a conventional clamping piston rod having at its exposed end a clamping cylindrical base with an annular mounting rod groove adjacent thereto, each locking rod having at said one end a locking cylindrical base and an annular locking rod groove adjacent thereto; said clamping and locking bases and said mounting and locking rod grooves being approximately equal in diameter; a first split locking ring positioned in said mounting groove; a second split clamping ring positioned in said locking rod groove; a spacer ring receiving and having a length approximately equal to the length of said locking and piston cylindrical bases abutted against one another and fastening means rigidly securing said split locking ring, said split clamping ring and said spacer to one another whereby a conventional piston cylinder can be utilized to provide clamp tonnage for said machine.

8. The machine of claim 7 wherein said upper movable platen is generally rectangular with a locking rod at each corner of said upper movable platen so that said plurality is four in number, said upper movable platen having a long side and short side, an angular support secured to said opposite locking ends of two locking rods at said short side and a structural support extending said long side secured to said angular support to form a bridge aligning said opposite ends of said guide rods with one another.

9. The machine according to any of claims 1 to 8, wherein said upper movable platen is generally rectangular in configuration having long and short sides between a top and a bottom surface;
   a vertically extending support frame mounted to said stationary platen having a pair of laterally spaced and parallel vertical guide rails secured to said frame, each guide rail having a pair of runner blocks secured thereto in a slidable manner;
   a pair of parallel mounting block plates secured to one of said long sides of said movable platen and extending above said top surface and below said bottom surface thereof; each mounting block plate confronting a guide rail and said runner blocks secured to said block mounting plates above and below said top and bottom movable platen surfaces whereby said vertically moveable upper platen is maintained at a set relationship to said lower stationary platen throughout its travel.

10. The machine of claim 9 further including a pair of vertically spaced cross-over members between said guide rails; a pair of vertical guide members inboard of said guide rails, each vertical guide member having a slidable guide block thereon, said injection unit movable on a carriage and having first and second carriage actuators, each carriage actuator secured to said injection unit and to one of said guide blocks for moving said injection unit into molding relationship with one of said upper and lower movable mold halves after the height of said carriage has been set.

11. The machine of claim 9 further including a rotatable table having a central opening situated to extend over the top of said lower stationary platen, said table having a generally flat top surface and a bottom surface having a generally flat circular track radially outward from and concentric with said central opening; a hollow spindle mounting block secured to said lower stationary platen; a hollow spindle extending through said central opening fixed to said table and rotatably and vertically movable in said spindle mounting block;
   a life mechanism including first and second lift assemblies positioned radially outwardly from and on diametrical opposite sides of said spindle mounting block, each lift assembly including a spring biased, travel limited roller block, at least one spherical roller protruding from said roller block in contact with said roller track and lift actuator block mounted to lower stationary platen and containing an actuator for lifting said roller block from an unactuated position whereat said spring biased roller block maintains said rollers in contact with said block while said table rests on and is supported by said lower stationary platen to an actuated position whereat said roller blocks are vertically lifted by said actuator to cause said table to rest on said spherical roller.

12. The machine of claim 11 wherein said spindle has a vertically extending spindle bore defined by an annular spindle wall, said spindle bore closed at the top end of said spindle protruding above said table and open at its bottom end beneath said table, said spindle top end having a plurality of threaded coolant fittings in fluid communication with said spindle bore and a coolant supply tube in sliding sealing engagement with said bottom end of said spindle bore.

13. The machine of claim 11 wherein said spindle has a plurality of vertically spaced annular inlet grooves formed in the radially outer portion of said spindle wall and a like plurality of vertically spaced annular return grooves formed in the radially outer portion of said spindle wall, each inlet groove in fluid communication with a vertically extending inlet passage in said spindle wall terminating at a hydraulic inlet at said table top surface; each return groove in fluid communication with a vertically extending return passage in said spindle wall terminating at a hydraulic return at said table top surface; said spindle block has for each inlet groove an annular inlet connection vertically aligned with a corresponding inlet groove which said inlet connection is in fluid communication with and for each return groove an annular return connection vertically aligned with a corresponding return groove which said return connection is in fluid communication with; each inlet and return groove having a flared opening adjacent its respective inlet and return connection wherein the flare is at least equal to the lift of said table, and an annular seal between said spindle and spindle block above and below each groove.

14. An injection molding machine having a two-platen clamp comprising:
   a) a lower stationary platen affixed to ground upon which a lower mold half is mounted;
   b) a vertically moveable upper platen having a moveable, upper mold half on a bottom side thereof in confronting relationship to said stationary mold half;
   c) an advance mechanism between said moveable and stationary platens for lowering and raising said moveable platen into and out of molding relationship with said stationary platen; and,
   d) a vertically extending support frame mounted to said stationary platen having a pair of laterally spaced and parallel vertical guide rails secured to said frame, each guide rail having a pair of runner blocks secured thereto in a slidable manner and each runner block being fixed to said moveable platen whereby said vertically moveable platen is maintained at a set relationship to said stationary platen throughout its travel.

15. The machine of claim 14 wherein said movable platen being generally rectangular in configuration, having long sides and short sides, a top surface and a bottom surface, a pair of parallel block mounting plates secured to one of said long sides and extending above said movable platen's top surface and below said movable platen's bottom surface, each block mounting plate confronting a guide rail and said runner blocks secured to said block mounting plates above and below said top and bottom movable platen surfaces.

16. The machine of claim 14 further including a pair of vertically spaced cross-over members between said guide rails; a pair of vertical guide members inboard of said guide rails, each vertical guide member having a slidable guide block thereon, said injection unit movable on a carriage and having first and second carriage actuators, each carriage actuator secured to said injection unit and to one of said guide blocks for moving said injection unit into molding relationship with one of said upper and lower movable mold halves after the height of said carriage has been set.

17. The machine of claim 16 further including a rotatable table having a central opening situated to extend over the top of said lower stationary platen, said table having a generally flat top surface and a bottom surface having a generally flat circular track radially outward from and concentric with said central opening; a hollow spindle mounting block secured to said lower stationary platen; a hollow spindle extending through said central opening, fixed to said table and rotatably and vertically movable in said spindle mounting block;

a lift mechanism including first and second lift assemblies positioned radially outwardly from and on diametrical opposite sides of said spindle mounting block, each lift assembly including a spring biased, travel limited roller block, at least one spherical roller protruding from said roller block in contact with said roller track and an actuator for lifting said roller block from an unactuated position whereat said spring biased roller block maintains said rollers in contact with said block while said table rests on and is supported by said lower stationary platen to an actuated position whereat said roller blocks are vertically lifted by said actuators to cause said table to rest on said spherical roller.

18. The machine of claim 17 wherein said spindle has a plurality of vertically spaced annular inlet grooves formed in the radially outer portion of said spindle wall and a like plurality of vertically spaced annular return grooves formed in the radially outer portion of said spindle wall, each inlet groove in fluid communication with a vertically extending inlet passage in said spindle wall terminating at a hydraulic inlet at said table top surface; each return groove in fluid communication with a vertically extending return passage in said spindle wall terminating at a hydraulic return at said table top surface; said spindle block has for each inlet groove an annular inlet connection vertically aligned with a corresponding inlet groove which said inlet connection is in fluid communication with and for each return groove an annular return connection vertically aligned with a corresponding return groove which said return connection is in fluid communication with; each inlet and return groove having a flared opening adjacent its respective inlet and return connection wherein the flare is at least equal to the lift of said table, and an annular seal between said spindle and spindle block above and below each groove.

19. An injection molding machine comprising a two-platen clamp arrangement including a lower stationary platen, a vertically upper movable platen, an actuating mechanism for raising and lowering said upper platen into a molding position and a rotatable table having a rotatable table having a central opening situated to extend over the top of said lower stationary platen, said table having a generally flat top surface and a bottom surface having a generally flat circular track radially outward from and concentric with said central opening; a hollow spindle mounting block secured to said lower stationary platen; a hollow spindle extending through said central opening, fixed to said table and rotatably and vertically movable in said spindle mounting block;

a lift mechanism including first and second lift assemblies positioned radially outwardly from and on diametrical opposite sides of said spindle mounting block, each lift assembly including a spring biased, travel limited roller block, at least one spherical roller protruding from said roller block in contact with said roller track and an actuator for lifting said roller block from an unactuated position whereat said spring biased roller block maintains said rollers in contact with said block while said table rests on and is supported by said lower stationary platen to an actuated position whereat said roller blocks are vertically lifted by said actuators to cause said table to rest on said spherical roller.

20. The machine of claim 19 wherein said spindle has a vertically extending spindle bore defined by an annular spindle wall, said spindle bore closed at the top end of said spindle protruding above said table and open at its bottom end beneath said table, said spindle top end having a plurality of threaded coolant fittings in fluid communication with said spindle bore and a coolant supply tube in sliding sealing engagement with said bottom end of said spindle bore.

21. The machine of claim 19 wherein said spindle has a plurality of vertically spaced annular inlet grooves formed in the radially outer portion of said spindle wall and a like plurality of vertically spaced annular return grooves formed in the radially outer portion of said spindle wall, each inlet groove in fluid communication with a vertically extending inlet passage in said spindle wall terminating at a hydraulic inlet at said table top surface; each return groove in fluid communication with a vertically extending return passage in said spindle wall terminating at a hydraulic return at said table top surface; said spindle block has for each inlet groove an annular inlet connection vertically aligned with a corresponding inlet groove which said inlet connection is in fluid communication with and for each return groove an annular return connection vertically aligned with a corresponding return groove which said return connection is in fluid communication with; each inlet and return groove having a flared opening adjacent its respective inlet and return connection wherein the flare is at least equal to the lift of said table, and an annular seal between said spindle and spindle block above and below each groove.

22. In an injection molding machine having a two-platen clamp arrangement including a lower stationary platen, an upper vertically movable platen, an actuating mechanism between said lower and upper platen for raising and lowering said upper platen into a molding position, a plurality of locking rods attached at one end to a clamp tonnage mechanism in said lower plate and extending through said movable platen adjacent its opposite end; and, a locking mechanism for selectively locking the locking rods to said movable platen, the machine comprising:

f) a locking device on the top side of said moveable platen having an unlocked position allowing relative movement between said movable and stationary platens and a locked position for locking said moveable platen at a set distance from said stationary platen, said locking device including;

i) a caliper for each locking rod having inboard and outboard caliper halves, each caliper half having a generally semi-circular, radially inward protruding lock ring adapted to fit within a locking groove when said inboard and outboard caliper halves are moved together to form a generally circular locking ring;

ii) first and second actuating rods, said first rod secured to said inboard caliper half of a first caliper at one end thereof and to said outboard caliper half of a second caliper at its opposite end, said second actuating rod secured to said outboard caliper half of said second caliper at one end thereof and to said inboard caliper half of said first caliper at its opposite end;

iii) a piston rod connector plate and a cylinder connector plate, said piston rod connector plate secured to said first actuating rod at a first distance between the ends of said first actuating rod and through which said first actuating rod extends, said piston rod connector plate having a first opening slidably receiving said second actuating rod; said cylinder connector plate fixed to said second actuating rod at a second distance between the ends of said second actuating rod and through which said second actuating rod extends, said cylinder connector plate having an opening slidably receiving said first actuating rod;

iv) a compression spring between said piston rod connector plate and said cylinder connector plate simultaneously biasing said inboard and outboard caliper halves of said first and second calipers to a closed position; and, v) an opening mechanism attached to said piston rod connector plate and to said cylinder connector plate for drawing said connector plates towards one another to simultaneously open said inboard and outboard caliper halves of said first and second calipers against the bias of said compression spring.

23. The injection molding machine of claim 22 wherein said moveable platen being generally rectangular in configuration having long longitudinally extending sides and short sides with a locking device adjacent a long side on said top surface of said movable platen so that said machine has two locking devices and said first and second calipers of each locking device assembly at opposite corners of a long side so that each machine has four locking rods;

said opening mechanism includes a piston moveable within a cylinder housing mounted to said cylinder connector plate; said piston having a piston rod extending therefrom mounted to said piston rod connector plate, said cylinder housing having a cylinder stop rod protruding in an opposite direction from said piston rod;

a piston rod mounting bracket secured to said moveable platen through which said piston rod slidably extends and a cylinder rod mounting bracket secured to said moveable platen through which said cylinder rod slidably extends;

said actuating rods connected only to said caliper halves and to said connector plates in turn connected only to said opening mechanism whereby the position of said actuator rods can float relative to said movable platen during actuation of said rods to assure positive opening and closing of said locking device.

24. The injection molding machine of claim 23 wherein each actuating rod includes long and short rod components, one of said rod components having at one end thereof a shoulder from which a threaded end protrudes and the other rod component includes a shoulder having a threaded opening therein, and each actuating rod secured to its respective connector plate by placing said threaded end of one of said rod components into engagement with said threaded end opening of the other one of said rod components such that said shoulders engage opposite sides of said connector plate.

25. The injection molding machine of claim 24 wherein each caliper has a long side generally parallel to said long side of said movable platen and any given caliper having an actuating rod secured to an outboard caliper half and an actuating rod secured to an inboard caliper half adjacent one long caliber side while an actuating rod secured to an inboard caliper half and an actuating rod secured to an outboard caliper half is adjacent the opposite long caliper side whereby even clamping forces are distributed by said locking rods to each caliper.

26. The injection molding machine of claim 25 further including a clamping piston cylinder mounted to said stationary platen for each locking rod with a conventional clamping piston rod having at its exposed end a clamping cylindrical base with an annular mounting rod groove adjacent thereto, each locking rod having at said one end a locking cylindrical base and an annular locking rod groove adjacent thereto; said clamping and locking bases and said mounting and locking rod grooves being approximately equal in diameter; a first split locking ring positioned in said mounting groove; a second split clamping ring positioned in said locking rod groove; a spacer ring receiving and having a length approximately equal to the length of said locking and piston cylindrical bases abutted against one another and fastening means rigidly securing said split locking ring, said split clamping ring and said spacer to one another whereby a conventional piston cylinder can be utilized to provide clamp tonnage for said machine.

27. The injection molding machine of claim 26 further including a first dashpot adjacent said plunger rod and a second dashpot adjacent said cylinder stop rod, said dashpot contacted by said plunger rod and by said cylinder stop rod when said locking device assembly moves from its unlocked to its locked condition.

28. The injection molding machine of claim 22 further including a clamping piston cylinder mounted to said stationary platen for each locking rod with a conventional clamping piston rod having at its exposed end a clamping cylindrical base with an annular clamping rod groove adjacent thereto, each locking rod having at said one end a locking cylindrical base and a cylindrical mounting groove adjacent thereto; said clamping and locking bases and said clamping and mounting grooves being approximately equal in diameter; a first split locking ring positioned in said mounting groove; a second split clamping ring positioned in said clamping groove; a spacer ring receiving and having a length approximately equal to the length of said locking and piston cylindrical bases abutted against one another and fastening means rigidly securing said split locking ring, said split clamping device and said spacer to one another whereby a conventional piston cylinder can be utilized to provide clamp tonnage for said machine.

29. The injection molding machine of claim 28 wherein said upper movable platen is generally rectangular with a locking rod at each corner of said upper movable platen so that said plurality is four in number, said upper movable platen having a long side and short side, an angular support secured to said opposite locking ends of two locking rods at said short side and a structural support extending said long side secured to said angular support to form a bridge aligning said opposite ends of said guide rods with one another.

* * * * *